United States Patent
Jansen et al.

(10) Patent No.: US 9,988,412 B2
(45) Date of Patent: Jun. 5, 2018

(54) METHODS FOR PREPARING THERMALLY STABLE LIGNIN FRACTIONS

(71) Applicant: Virdia, Inc., Raceland, LA (US)

(72) Inventors: Robert Jansen, Collinsville, IL (US); James Alan Lawson, Ellsworth, ME (US); Noa Lapidot, Mevaseret Zion (IL); Bassem Hallac, Jerusalem (IL); Perry Rotem, Bazra (IL)

(73) Assignee: VIRDIA, INC., Raceland, LA (US)

(*) Notice: Subject to any disclaimer, the term of this patent is extended or adjusted under 35 U.S.C. 154(b) by 0 days. days.

(21) Appl. No.: 15/593,752

(22) Filed: May 12, 2017

(65) Prior Publication Data

US 2018/0079766 A1 Mar. 22, 2018

Related U.S. Application Data

(63) Continuation of application No. 14/787,756, filed as application No. PCT/US2014/036704 on May 2, 2014, now Pat. No. 9,683,005.

(60) Provisional application No. 61/819,485, filed on May 3, 2013, provisional application No. 61/953,572, filed on Mar. 14, 2014.

(51) Int. Cl.
C07G 1/00 (2011.01)
D21C 11/00 (2006.01)
D21C 3/20 (2006.01)

(52) U.S. Cl.
CPC .......... *C07G 1/00* (2013.01); *D21C 3/20* (2013.01); *D21C 11/0007* (2013.01)

(58) Field of Classification Search
CPC combination set(s) only.
See application file for complete search history.

(56) References Cited

U.S. PATENT DOCUMENTS

| | | |
|---|---|---|
| 2,380,448 A | 7/1945 | Katzen |
| 2,772,965 A | 12/1956 | Gray et al. |
| 3,808,192 A | 4/1974 | Dimitri M |
| 4,111,928 A | 9/1978 | Holsopple et al. |
| 4,237,110 A | 12/1980 | Forster et al. |
| 4,277,626 A | 7/1981 | Forss et al. |
| 4,470,851 A | 9/1984 | Paszner et al. |
| 4,520,105 A | 5/1985 | Sinner et al. |
| 4,740,591 A | 4/1988 | Dilling et al. |
| 4,797,457 A | 1/1989 | Guiver et al. |
| 4,946,946 A | 8/1990 | Fields et al. |

(Continued)

FOREIGN PATENT DOCUMENTS

| | | |
|---|---|---|
| CA | 2812685 A1 | 3/2012 |
| CN | 101143881 A | 3/2008 |

(Continued)

OTHER PUBLICATIONS

Abacherli, et al. Lignin Analytical Cluster, "Towards Standardisation of Methods". Rome, Forum 8, May 10-12, 2007.

(Continued)

*Primary Examiner* — Ellen McAvoy
*Assistant Examiner* — Chantel Graham
(74) *Attorney, Agent, or Firm* — Wilson Sonsini Goodrich & Rosati

(57) ABSTRACT

The present invention relates to fractions of high purity lignin which are thermally stable, and to methods of producing said fractions from lignocellulosic material.

20 Claims, 12 Drawing Sheets

(56) References Cited

U.S. PATENT DOCUMENTS

| | | | |
|---|---|---|---|
| 4,966,650 A | 10/1990 | Delong et al. | |
| 5,730,837 A | 3/1998 | Black et al. | |
| 5,865,948 A | 2/1999 | Lora et al. | |
| 5,968,417 A | 10/1999 | Viswanathan | |
| 6,022,419 A | 2/2000 | Torget et al. | |
| 6,620,292 B2 | 9/2003 | Wingerson | |
| 7,465,791 B1 | 12/2008 | Hallberg et al. | |
| 7,649,086 B2 | 1/2010 | Belanger et al. | |
| 7,678,358 B2 | 3/2010 | Eckert et al. | |
| 7,699,958 B2 | 4/2010 | Griffith et al. | |
| 7,794,824 B2 | 9/2010 | Eckert et al. | |
| 9,139,681 B2 | 9/2015 | Fitchett et al. | |
| 9,657,146 B2 | 5/2017 | Jansen et al. | |
| 9,683,005 B2 | 6/2017 | Jansen et al. | |
| 2003/0156970 A1 | 8/2003 | Oberkofler et al. | |
| 2003/0221804 A1 | 12/2003 | Lightner | |
| 2004/0060673 A1 | 4/2004 | Phillips et al. | |
| 2004/0101459 A1 | 5/2004 | Schur | |
| 2004/0108085 A1 | 6/2004 | Kettenbach et al. | |
| 2004/0244925 A1 | 12/2004 | Tarasenko | |
| 2007/0160926 A1 | 7/2007 | Ayaki et al. | |
| 2008/0032344 A1 | 2/2008 | Fallavollita | |
| 2008/0057555 A1 | 3/2008 | Nguyen | |
| 2008/0202504 A1 | 8/2008 | Hilst | |
| 2008/0317661 A1 | 12/2008 | Eckert et al. | |
| 2008/0318043 A1 | 12/2008 | Eckert et al. | |
| 2009/0062516 A1 | 3/2009 | Belanger et al. | |
| 2009/0069550 A1 | 3/2009 | Belanger et al. | |
| 2009/0176286 A1 | 7/2009 | O'Connor et al. | |
| 2009/0229599 A1 | 9/2009 | Zhang et al. | |
| 2010/0159519 A1 | 6/2010 | Diner et al. | |
| 2010/0269990 A1 | 10/2010 | Dottori et al. | |
| 2010/0279361 A1 | 11/2010 | South et al. | |
| 2010/0279372 A1 | 11/2010 | Cho et al. | |
| 2010/0305241 A1 | 12/2010 | Balakshin et al. | |
| 2011/0073805 A1 | 3/2011 | Dibble et al. | |
| 2011/0274612 A1* | 11/2011 | Wohlmann | C08G 18/6492 423/447.2 |
| 2011/0294991 A1 | 12/2011 | Lake et al. | |
| 2011/0297340 A1 | 12/2011 | Kouisni et al. | |
| 2012/0116063 A1 | 5/2012 | Jansen et al. | |
| 2012/0167874 A1 | 7/2012 | Jansen et al. | |
| 2012/0226029 A1 | 9/2012 | Dodd | |
| 2012/0289692 A1 | 11/2012 | Gray et al. | |
| 2013/0183227 A1 | 7/2013 | Wohlmann et al. | |
| 2014/0171379 A1 | 6/2014 | Jansen et al. | |
| 2014/0227161 A1 | 8/2014 | Manesh et al. | |
| 2014/0242867 A1 | 8/2014 | Jansen et al. | |
| 2015/0141628 A1 | 5/2015 | Jansen et al. | |
| 2017/0130398 A1 | 5/2017 | Jansen et al. | |
| 2017/0313826 A1 | 11/2017 | Jansen et al. | |

FOREIGN PATENT DOCUMENTS

| | | |
|---|---|---|
| CN | 102027021 A | 4/2011 |
| CN | 102361914 A | 2/2012 |
| EP | 0224721 B1 | 6/1991 |
| EP | 04465560 B1 | 8/1995 |
| EP | 1272433 B1 | 1/2004 |
| GB | 1525508 A | 9/1978 |
| JP | 2011256380 A | 12/2011 |
| WO | WO-9641052 A1 | 12/1996 |
| WO | WO-0132715 A1 | 5/2001 |
| WO | WO-0202826 A1 | 1/2002 |
| WO | WO-2006086861 A2 | 8/2006 |
| WO | WO-2006086861 A3 | 10/2006 |
| WO | WO-2007019505 A2 | 2/2007 |
| WO | WO-2007019505 A3 | 6/2007 |
| WO | WO-2008144903 A1 | 12/2008 |
| WO | WO-2009002785 A1 | 12/2008 |
| WO | WO-2009021733 A2 | 2/2009 |
| WO | WO-2009028969 A1 | 3/2009 |
| WO | WO-2009021733 A3 | 6/2009 |
| WO | WO-2009068711 A1 | 6/2009 |
| WO | WO-2009104995 A1 | 8/2009 |
| WO | WO-2010043424 A1 | 4/2010 |
| WO | WO-2010045576 A2 | 4/2010 |
| WO | WO-2010060183 A1 | 6/2010 |
| WO | WO-2010045576 A3 | 7/2010 |
| WO | WO-2010081231 A1 | 7/2010 |
| WO | WO-2010146331 A2 | 12/2010 |
| WO | WO-2011007369 A1 | 1/2011 |
| WO | WO-2011037967 A2 | 3/2011 |
| WO | WO-2011097721 A1 | 8/2011 |
| WO | WO-2011151823 A1 | 12/2011 |
| WO | WO-2012120184 A2 | 9/2012 |
| WO | WO-2012138801 A2 | 10/2012 |
| WO | WO2012138802 * | 10/2012 |
| WO | WO-2012138802 A1 | 10/2012 |
| WO | WO-2012151524 A2 | 11/2012 |
| WO | WO-2013083876 A2 | 6/2013 |
| WO | WO-2013166469 A2 | 11/2013 |
| WO | WO-2014046826 A1 | 3/2014 |
| WO | WO-2014076612 A1 | 5/2014 |
| WO | WO-2014078120 A1 | 5/2014 |
| WO | WO-2014116173 A1 | 7/2014 |
| WO | WO-2014178911 A1 | 11/2014 |
| WO | WO-2014179777 A1 | 11/2014 |
| WO | WO-2016007550 A1 | 1/2016 |

OTHER PUBLICATIONS

Acevedo, et al. Surface Activity of Lignin Fractions isolated by Organic Solvents. Powerpoint. 2005.

Asikkala, et. al. Accurate and reproducible determination of lignin molar mass by acetobromination. Journal of agricultural and food chemistry. 2012; 60:3968-3973.

Baker. Utilization of Sustainable Resources for Materials for Production of Carbon Fiber Structural and Energy Efficiency Applications. Oak Ridge National Laboratory, Tennessee, USA. Nordic Wood Biorefinery Conference, Stockholm, Sweden, Mar. 22-24, 2011.

Brauns et al. Studies on Lignin and Related Compounds: XII. Methanol Lignin. Canadian Journal of Research 13b(1):28-34 (1935).

Brauns, Friedrich Emil. The Chemistry of Lignin. Academic Press. 1952. pp. 66, 67, and 127.

Bridgwater. Review of fast pyrolysis of biomass and product upgrading. Biomass and Bioenergy. 2012; 38:68-94.

Bulushev, et al. Catalysis for conversion of biomass to fuels via pyrolysis and gasification: A review. Catalysts Today. 2001; 171: 1-13.

Chaow-U-Thai et al. Removal of ash from sugarcane leaves and tops. International Journal of Biosciences.2012; 2(5): 12-17.

Chatterjee, et al. Lignin-Derived Advanced Carbon Materials. ChemSusChem. Dec. 2015;8(23):3941-58. doi: 10.1002/cssc. 201500692. Epub Nov. 16, 2015.

Compere, et al. Evaluation of Lignin from Alkaline-Pulped Hardwood Black Liquor. Oak Ridge National Laboratory, US Department of Energy, under contract DE-AC05-000822725, ORNLITM-2005/88. May 2005.

Compere, et al. Improving the fundamental properties of lignin-based carbon fiber for transportation application. Oak Ridge National Lab. 2009.

Compere, et al. Low cost carbon fiber from renewable resources. Carbon. 1998; 36(7-8):1119-1124.

Constantinescu, et al. Lignin hydrophobization by different esterification reactions. ILI—Forum 8, May 10-12, 2007.

Cui, et al. Toward thermoplastic lignin polymers; part II: thermal & polymer characteristics of kraft lignin & derivatives. BioResources 8.1 (2013): 864-886.

Economy, et al. Activated carbon fibers—past, present, and future. 1996; 321-358.

European search report and opinion dated Feb. 4, 2016 for EP Application No. 14791180.4.

European search report and opinion dated Mar. 24, 2016 for EP Application No. 13883539.

(56) References Cited

OTHER PUBLICATIONS

Finney, et al. Fuel Pelletization with a Binder: Part I—Identification of a Suitable Binder for Spent Mushroom Compost—Coal Tailing Pellets. Energy & Fuels, 2009, 23 (6), pp. 3195-3202.

Gabilondo, et al. Lignin low molar mass fractions involvement in the synthesis of PF matrices. 2007.

Glasser. Lignin retrospect and prospect. 2010.

Gosselink et al. Lignin as a renewable aromatic resource for the chemical industry. PhD Thesis; Wageningen University, Wageningen, NL; 2011.

Gosselink, et al. Analysis of isolated lignin samples using organic and alkaline SEC and MALDI-TOF-MS. Agrotechnology & Food Sciences Group. 2006.

Gosselink, et al. Analytical protocols for characterisation of sulphur-free lignin. Industrial Crops and Products. 2004; 19:271-281.

Gosselink, et al. Co-ordination network for lignin—standardisation, production and applications adapted to market requirements (EUROLIGNIN). Industrial Crops and Products 2004; 20:121-129.

Gosselink, et al. Lignin depolymerization under supercritical process conditions. Agrotechnology & Food Sciences Group. 2008.

Gosselink, et al. Valorization of lignin resulting from biorefineries. Jun. 4, 2008, RRB4 Rotterdam.

Griffith, et al. Low cost carbon fiber for transportation application. USDE. 2003.

Guerra, et al. Comparative evaluation of three lignin isolation protocols for various wood species. J Agric Food Chem. Dec. 27, 2006;54(26):9696-705.

Guerra, et al. On the Propensity of Lignins to Associate. Organic Chemistry of Wood Components Laboratory Department of Forest Biomaterials Science & Engineering North carolina State Raleigh, North Carolina USA. 2007.

Guerra, et al. Toward a better understanding of the lignin isolation process from wood. J Agric Food Chem. Aug. 9, 2006;54(16):5939-47.

Hage, et al. Effects of process severity on the chemical structure of Miscanthus ethanol organosolv lignin. Polymer Degradation and Stability. 2010; 95:997-1003.

Hagglund. Hydrochloric acid lignin (preliminary communication). Berichte der Deutschen Chemischen Gesellschaft [Abteilung] B: Abhandlungen (1923), 56B 1866-8. CODEN: BDCBAD ISSN: 0365-9488. Abstract only.

Hallac, et al. Biomass Characterization and Organosolv Pretreatment of Buddleja davidii. School of Chemistry and Biochemistry, Institute of Paper Science and Technology, Georgia Institute of Technology, Atlanta, GA. 2009.

Hallac, et al. Biomass Characterization of Buddleja davidii: A Potential Feedstock for Biofuel Production. J. Agric. Food Chem. 2009; 57(4):1275-1281.

Hallac, et al. Chemical Transformations of Buddleja davidii Lignin during Ethanol Organosolv Pretreatment. Energy Fuels. 2010; 24:2723-2732.

Hallac. Fundamental understanding of the biochemical conversion of buddleja davidii to fermentable sugars. Georgia Institute of Technology. May 2011.

Harris. Derived products and chemical utilization of wood waste. Forest Products Laboratory; Forest Service US Department of Agriculture; Rept. No. R1666-10. Jun. 1949.

Holladay, et al. Top Value-Added Chemicals from Biomass vol. II—Results of Screening for Potential Candidates from Biorefinery Lignin. Pacific Northwest National Laboratory, Prepared for the U.S. Department of Energy. Oct. 2007.

Ibarra, et al. Isolation of high-purity residual lignins from eucalypt paper pulps by cellulase and proteinase treatments followed by solvent extraction. Enzyme and Microbial Technology. 2004; 35:173-181.

International preliminary report on patentability dated Nov. 12, 2015 for PCT/US2013/068824.

International preliminary report on patentability dated Nov. 12, 2015 for PCT/US2014/036704.

International search report and written opinion dated Jul. 17, 2014 for PCT/US2013/068824.

International search report and written opinion dated Sep. 5, 2014 for PCT/US2014/036704.

Kadla, et al. Lignin-based carbon fibers for composite fiber applications. Carbon. 2002; 40:2913-2920.

Khunsupat, et al. Molecular Weight Distribution of Lignin. Presentation; Georgia Institute of Technology. 2014.

Koullas, et al. Analytical methods for lignin characterization—differential scanning calorimetry. Cellulose Chem. Technol. 2006; 40(9-10):719-725.

Kubo, et al. Lignin-based Carbon Fibers: Effect of Synthetic Polymer Blending on Fiber Properties. Journal of Polymers and the Environment. Apr. 2005; 13(2):97-105.

Kubo, et al. Poly(Ethylene Oxide)/Organosolv Lignin Blends: Relationship between Thermal Properties, Chemical Structure, and Blend Behavior. Macromolecules. 2004; 37:6904-6911.

Kubo, et al. Preparation of carbon fibers from softwood lignin by atmospheric acetic acid pulping. Carbon. 1998; 36(7-8):1119-1124.

Kubo, et al. Surface Porosity of Lignin/PP Blend Carbon Fibers. Journal of Wood Chemistry and Technology. 2007; 27: 257-271.

Kubo, et al. Thermal Decomposition Study of Isolated Lignin Using Temperature Modulated TGA. Journal of Wood Chemistry and Technology. 2008; 28(2):106-121.

Lange, et al. On the implications of calibration techniques and detector systems on GPC-based analyses of lignin. Cost action FP 0901 (presentation), 2013.

Li, et al. Interaction of Supercritical Fluids with Lignocellulosic Materials. Ind. Eng. Chem. Res. 1988; 27:1301-1312.

Liitia, et al. Application of Solid-State $^{13}$C NMR Spectroscopy and Dipolar Dephasing Technique to Determine the Extent of Condensation in Technical Lignins. Solid State Nuclear Magnetic Resonance. 2002; 21:171-186.

Lora, et al. Recent Industrial Applications of Lignin: A Sustainable Alternative to Nonrenewable Materials. Journal of Polymers and the Environment, Apr. 2002; 10(1-2):39-48.

Lora, et al. Use of sulfur-free lignin in wood adhesives: Industrial experiences and environmental impacts. 2005; 8-14.

Lora. Lignin recovery technology transfer: first industrial implementation of the LPS process in India. 2005.

Marcano, et al. Surface activity of lignin fractions obtained at different pH values. 2005.

Nguyen, et al. Is gel permeation chromatography applicable to lignin? 2007.

Nguyen, et al. Molecular weight in LignoAnalyse 1, "Is EPC applicable to lignin?". Rome, Forum 8, May 10-12, 2007.

Pakarinen, et al. Evaluation of preservation methods for improving biogas production and enzymatic conversion yields of annual crops. Biotechnol Biofuels. Jul. 19, 2011;4(1):20. doi: 10.1186/1754-6834-4-20.

Pepper, et al. The effect of initial acid concentration on the lignin isolated by the acidolysis of aspen wood. Can J. Chem. 1961; 39:1454-1461.

Ragauskas, et al. From wood to fuels Integrating biofuels and pulp production. Industrial biotechnology. 2006; 2(1):55-65.

Ragauskas. Rediscovering the Future of Lignin Chemistry. 2003.

Reinhold. SEC of lignins. Mainz, Germany. 2007.

Sadeghifar, et al. Toward thermoplastic lignin polymers. Part 1. Selective masking of phenolic hydroxyl groups in kraft lignins via methylation and oxypropylation chemistries. Industrial & Engineering Chemistry Research 51.51 (2012):16713-16720.

Sadeghifar, et al. Understanding the Variables that Define Tg for Kraft Lignin and Procedure for its Determination. Departments of Chemistry and Forest Biomaterials. North Carolina State University. Raleigh , NC USA. 2012.

Saito, et al. Methanol fractionation of softwood Kraft lignin: impact on the lignin properties. ChemSusChem. Jan. 2014;7(1):221-8. doi: 10.1002/cssc.201300509. Epub Nov. 4, 2013.

Samuel, et al. Structural Characterization and Comparison of Switchgrass Ball-milled Lignin Before and after Dilute Acid Pretreatment. Appli. Micr. BioTech. 2010, 162:62-74.

(56) References Cited

OTHER PUBLICATIONS

Sannigrahi, et al. Lignin structural modifications resulting from ethanol organosols treatment of loblolly pine. Energy Fuel 2010; 24(1): 683-689.

Shen, et al. Lignin-Based Activated Carbon Fibers and Controllable Pore Size and Properties. Journal of Applied Polymer Science. 2011; 121:989-994.

Strassbreger, et al. The pros and cons of lignin valorisation in an integrated biorefinery. RSC Advances 4.48 (2014): 25310-25318.

Sudo, et al. A New Modification Method of Exploded Lignin for the Preparation of a Carbon Fiber Precursor. Journal of Applied Polymer Science. 1993; 48:1485-1491.

Svensson. Minimizing the sulfur content in Kraft lignin. Degree Project, ECTS 30.0,At STFI—Packforsk, Stockholm, 2008.

Toledano, et al. Characterization of key functional groups of lignin. 5th Italian meeting on lignocellulosic chemistry. Sep. 1-4, 2009—Villa Monastero Varenna (Lecco) Italy.

Toledano, et al. Study of fractionation of lignin by ultrafiltration and selective recipitation. 2009.

Uraki, et al. Preparation of activated carbon fibers with large specific surface area from softwood acetic acid lignin. J Wood Sci. 2001; 47:465-469.

Velez, et al. Temperature effects on molecular properties of liquid lignin recovered from kraft black liquor. ACS Sustainable Chem. Eng. 2015; 3:1032-1038.

Wang, et al. Molecular Characteristics of Kraft-AQ Pulping Lignin Fractionated by Sequential Organic Solvent Extraction. Int. J. Mol. Sci. 2010; 11:2988-3001.

Warren. Future Lower Cost Carbon Fiber for Autos: International Scale-up & What is Needed. Oak Ridge National Laboratory, Tennessee, USA. 2007.

Yang, et al. Alcohol adsorption on softwood lignin from aqueous solutions. Biotechnol Bioeng. Feb. 5, 1990;35(3):268-78.

Zhao, et al., Organosolv pretreatment of lignocellulosic biomass for enzymatic hydrolysis, Appl Microbiol Biotechnol (2009) 82:815-827.

Zoia, et al. Microwave-assisted lignin isolation using the enzymatic mild acidolysis (EMAL) protocol. J Agric Food Chem. Nov. 12, 2008;56(21):10115-22. doi: 10.1021/jf801955b. Epub Oct. 15, 2008.

Hu, Thomas Q. Recent Advances in the Isolation and Analysis of Lignins and Lignin-Carbohydrate Complexes. Characterization of Lignocellulosic Materials. Copyright © 2008 Blackwell Publishing Ltd. Published Online: Mar. 3, 2009. pp. 148-170. DOI: 10.1002/9781444305425.ch9.

Kudahettige-Nilsson, et al. Biobutonal production by clostridium acetobutylicum using xylose recovered from birch kraft black liquor. Bioresource Technology. 2015; 176:71-79.

Lange, et al. On the imlicatiions of calibration techniques and detector systems on GPC-based analyses of lignin. Cost action FP 0901 (presentation), 2013.

Lin and Dence (Eds), Methods in lignin chemistry. Springer Berlin Heidelberg, 1992, p. 208.

Nanayakkar et al. Understanding the Degree of Condensation of Phenolic and Etherified C-9 Units of in Situ Lignins. Journal of Agricultural and Food Chemistry. vol. 59. 12514-12519.

Nguyen, et al. Molecular weight and functional group analysis of a Soda lignin fractionated by ultrafiltration and selective dissolution. 2008.

Notice of Allowance dated Apr. 20, 2017 for U.S. Appl. No. 14/787,756.

Office Action dated Oct. 6, 2017 for U.S. Appl. No. 14/787,756.

Pinoresinol compound information, SciFinder Scholar, downloaded Sep. 29, 2017, 3 pages.

Roy et al. Short and Stereoselective Total Synthesis of Furano Lignans (±)-Dihydrosesamin, (±)-Lariciresinol Dimethyl Ether, (±)-Acuminatin Methyl Ether, (±)-Sanshodiol Methyl Ether, (±)-Lariciresinol, (±)-Acuminatin, and (±)-Lariciresinol Monomethyl Ether and Furofuran Lignans (±)-Sesamin, (±)-Eudesmin, (±)-Piperitol Methyl Ether, (±)-Pinoresinol, (±)-Piperitol, and (±)-Pinoresinol Monomethyl Ether by Radical Cyclization of Epoxides Using a Transition-Metal Radical Source. J. Org. Chem., 2002, 67 (10), pp. 3242-3248.

Sadeghifar, et al. Macroscopic Behavior of Kraft Lignin Fractions: Melt Stability Considerations for Lignin-Polyethylene Blends. ACS Sustainable Chem. Eng., 2016, 4 (10), pp. 5160-5166. DOI: 10.1021/acssuschemeng.6b00636.

Sadeghifar, et al. Toward Carbon Fibers from Single Component Kraft Lignin Systems: Optimization of Chain Extension Chemistry. ACS Sustainable Chem. Eng., 2016, 4 (10), pp. 5230-5237. DOI: 10.1021/acssuschemeng.6b00848.

Yamauchi et al. Effect of the benzylic structure of lignan on antioxidant activity. Biosci Biotechnol Biochem. Sep. 2007;71(9):2283-90.

Saake et al. A comparison of lignin polymer models (DHPs) and lignins by 31P NMR spectroscopy. Phytochemistry. vol. 43, Issue 2, Sep. 1996, pp. 499-507.

* cited by examiner

METHODS FOR PREPARING THERMALLY STABLE LIGNIN FRACTIONS

CROSS-REFERENCE

This application is a Continuation Application which claims the benefit of U.S. application Ser. No. 14/787,756, filed Oct. 28, 2015, which is a 371 National Stage Entry of PCT/US14/36704 filed May 2, 2014, which claims the benefit of Provisional Application No. 61/819,485, filed on May 3, 2013, and Provisional Application No. 61/953,572, filed on Mar. 14, 2014, each incorporated herein by reference in its entirety.

INCORPORATION BY REFERENCE

All publications, patents, and patent applications mentioned in this specification are herein incorporated by reference to the same extent as if each individual publication, patent, or patent application was specifically and individually indicated to be incorporated by reference.

FIELD OF THE INVENTION

The invention relates to a method for fractionating lignin, to stable lignin fractions, and to the use thereof.

BACKGROUND OF THE INVENTION

Lignin, a highly abundant natural polymer that can be extracted from biomass, is a polymer of preference for various applications and as a chemical feedstock that replaces petrochemicals. Industrial utilization of lignin is difficult given its variable nature, functionality, reactivity, and heterogeneity. It is desirable to fractionate lignin into stable fractions that have reduced variability in size, composition and reactivity. Fractionation of lignin by membrane filtration using ultrafiltration and nanofiltration membranes results in unstable fractions of lignin that change while being fractionated, and is thus futile. It is also a challenge to characterize the obtained fractions by a reliable method, as chromatography of lignin by size is notoriously dependent on experimental procedure and lack of good standards and suited detectors, and should be considered as relative rather than absolute.

It is the purpose of this invention to prepare thermally stable fractions of high purity lignin by methods that can be applied by industrial means.

SUMMARY OF THE INVENTION

The invention provides a method of fractionating high purity lignin to fractions that are stable. The invention further provides a way to evaluate stability of lignin fractions by methods that are typically applied to synthetic polymers of much more uniform structure. The invention further provides a whole process to extract high purity lignin from biomass and to fractionate it to distinctly different and stable high purity lignin fractions.

The invention also provides a lignin composition having a stable glass transition temperature determined using differential scanning calorimetry according to DIN 53765-1994. In some embodiments, the temperature difference between the first cycle glass transition and the second cycle glass transition is less than 5° C.

The invention further provides a method of producing high purity lignin from a biomass. The method involves (i) removing hemicellulose sugars from the biomass thereby obtaining a lignin-containing remainder; wherein the lignin-containing remainder comprises lignin and cellulose; (ii) contacting the lignin-containing remainder with a lignin extraction solution to produce a lignin extract and a cellulosic remainder; wherein the lignin extraction solution comprises a limited-solubility solvent, an organic acid, and water, wherein the limited-solubility solvent and water form an organic phase and an aqueous phase; and (iii) separating the lignin extract from the cellulosic remainder; wherein the lignin extract comprises lignin dissolved in the limited-solubility solvent. Optionally, the removal of the hemicellulose sugars does not remove a substantial amount of the cellulosic sugars. Optionally, the limited-solubility solvent and the water in the lignin extraction solution are in a ratio of about 1:1. In some embodiments, the method further involves purifying the cellulosic remainder to obtain cellulose pulp. Optionally, the cellulose pulp comprises lignin in an amount up to 10% weight/weight. Optionally, the cellulose pulp comprises lignin in an amount up to 7% weight/weight. In some embodiments, the method further involves contacting the lignin extract with a strong acid cation exchanger to remove residual cations thereby obtaining a purified lignin extract. In some embodiments, the method further involves separating the limited-solubility solvent from the lignin extract thereby obtaining high purity lignin. In some embodiments, the method further involves evaporating the limited-solubility solvent from the lignin. Optionally, the evaporating comprises spray drying.

Further provided is a lignin composition characterized (on a dry matter basis) by at least one characteristic selected from the group consisting of: i) a glass transition temperature (Tg) above 160° C. or below 90° C. as determined using differential scanning calorimetry (DSC) according to DIN 53765-1994; ii) a consistent glass transition temperature (Tg) as determined by multiple differential scanning calorimetry (DSC) runs of the same lignin portion; iii) a mass average molar mass ($M_W$) greater than 10,000 Da as measured by gel permiation chromatography (GPC); iv) a number average molar mass ($M_N$) greater than 6,200 Da as measured by gel permiation chromatography (GPC); v) a mass average molar mass ($M_W$) less than 2,500 Da as measured by gel permiation chromatography (GPC); vi) number average molar mass ($M_N$) less than 1,000 Da as measured by gel permiation chromatography (GPC); vii) a polydispersity less than 7.00 as measured by gel permiation chromatography (GPC); viii) a formula of $C_9H_XO_Y$; wherein X is less than 12 and Y is less than 3.5; ix) degree of condensation less than 0.8 as determined by NMR; x) methoxyl content (#/aryl group) as determined by NMR is less than 1.4; xi) aliphatic linkages (β-O-4') (#/aryl group) less than 0.6; xii) ratio of Aromatic C—O:Aromatic C—C: Aromatic C—H (#/aryl group) 1.6:2.3:2.1 or 1.6:2.2:2.2; xiii) amount of aromatic C—O bonds (#/aryl group) is less than 2.1; xiv) elemental composition of greater than 61% carbon, less than 27% oxygen, and less than 0.5% nitrogen by mass as measured by elemental analysis; xv) a solid lignin composition comprising a marker molecule at a concentration of at least 100 ppb; xvi) less than 0.1 times the volatile sulfur compounds found in Kraft lignin; xvii) an ash content of less than 0.5%; xviii) an ash content of less than 0.1%; xix) a sulfur content of less than 700 PPM; xx) a phosphorus content of less than 100 PPM; xxi) a soluble carbohydrate content of less than 0.5%; xxii) substantially soluble in an organic solvent; and xxiii) substantially soluble in an organic solvent. In some embodiments, the lignin is characterized by at least three of said characteristics from said group. In some embodiments, the lignin is characterized by at least five of said characteristics from said group. In some embodiments, the lignin is characterized by at least eight of said characteristics from said group. In some embodiments, the lignin is characterized by at least ten of said characteristics from said group. In some embodiments, the lignin is characterized by at least twelve of said characteristics from said group. In some embodiments, the lignin is characterized by at least fourteen of said characteristics from said group. In some embodiments, the lignin is characterized by at least sixteen of said characteristics from said group. In some embodiments, the lignin is characterized by at least eighteen of said characteristics from said group. In some embodiments, the lignin is characterized by at least nineteen of said characteristics from said group. In some embodiments, the lignin is characterized (on a dry matter basis) by sixteen or more characteristics selected from the group consisting of: i) a glass transition temperature (Tg) above 160° C. as determined using differential scanning calorimetry (DSC) according to DIN 53765-1994; ii) a consistent glass transition temperature (Tg) as determined by multiple differential scanning calorimetry (DSC) runs of the same lignin portion; iii) a mass average molar mass ($M_W$) greater than 10,000 Da as measured by gel permiation chromatography (GPC); iv) a number average molar mass ($M_N$) greater than 6,200 Da as measured by gel permiation chromatography (GPC); v) a polydispersity less than 7.00 as measured by gel permiation chromatography (GPC); vi) a formula of $C_9H_XO_Y$; wherein X is less than 12 and Y is less than 3.5; vii) degree of condensation less than 0.8 as determined by NMR; viii) methoxyl content (#/aryl group) as determined by NMR is less than 1.4; ix) aliphatic linkages (β-O-4') (#/aryl group) less than 0.6; x) ratio of Aromatic C—O:Aromatic C—C:Aromatic C—H (#/aryl group) 1.6:2.2:2.2; xi) amount of aromatic C—O bonds (#/aryl group) is less than 2.1; xii) elemental composition of greater than 61% carbon, less than 27% oxygen, and less than 0.5% nitrogen by mass as measured by elemental analysis; xiii) a solid lignin composition comprising a marker molecule at a concentration of at least 100 ppb; xiv) less than 0.1 times the volatile sulfur compounds found in Kraft lignin; xv) an ash content of less than 0.5%; xvi) a sulfur content of less than 700 PPM; xvii) a phosphorus content of less than 100 PPM; xviii) a soluble carbohydrate content of less than 0.5%; xix) substantially insoluble in an organic solvent. In some embodiments, the lignin is characterized (on a dry matter basis) by sixteen or more characteristics selected from the group consisting of: i) a glass transition temperature (Tg) below 90° C. as determined using differential scanning calorimetry (DSC) according to DIN 53765-1994; ii) a consistent glass transition temperature (Tg) as determined by multiple differential scanning calorimetry (DSC) runs of the same lignin portion; iii) a mass average molar mass ($M_W$) less than 2,500 Da as measured by gel permiation chromatography (GPC); iv) a number average molar mass ($M_N$) less than 1,000 Da as measured by gel permiation chromatography (GPC); v) a polydispersity less than 7.00 as measured by gel permiation chromatography (GPC); vi) a formula of $C_9H_XO_Y$; wherein X is less than 12 and Y is less than 3.5; vii) degree of condensation less than 0.8 as determined by NMR; viii) methoxyl content (#/aryl group) as determined by NMR is less than 1.4; ix) aliphatic linkages (β-O-4') (#/aryl group) less than 0.6; x) ratio of Aromatic C—O: Aromatic C—C:Aromatic C—H (#/aryl group) 1.6:2.2:2.2; xi) amount of aromatic C—O bonds (#/aryl group) is less than 2.1; xii) elemental composition of greater than 61% carbon, less than 27% oxygen, and less than 0.5% nitrogen by mass as measured by elemental analysis; xiii) a solid lignin composition comprising a marker molecule at a concentration of at least 100 ppb; xiv) less than 0.1 times the volatile sulfur compounds found in Kraft lignin; xv) an ash content of less than 0.5%; xvi) a sulfur content of less than 700 PPM; xvii) a phosphorus content of less than 100 PPM; xviii) a soluble carbohydrate content of less than 0.5%; xix) substantially soluble in an organic solvent. In some embodiments of the lignin described herein, the lignin has a glass transition temperature above 160° C. determined using differential scanning calorimetry according to DIN 53765-1994. In some embodiments of the lignin described herein, the lignin has a glass transition temperature above 190° C. determined using differential scanning calorimetry according to DIN 53765-1994. In some embodiments of the lignin described herein, the lignin has a mass average molar mass ($M_W$) greater than 10,000 Da as measured by gel permiation chromatography (GPC); and a number average molar mass ($M_N$) greater than 6,200 Da as measured by gel permiation chromatography (GPC). In some embodiments of the lignin described herein, the lignin has a glass transition temperature below 100° C. determined using differential scanning calorimetry according to DIN 53765-1994. In some embodiments of the lignin described herein, the lignin has a glass transition temperature below 90° C. determined using differential scanning calorimetry according to DIN 53765-1994. In some embodiments of the lignin described herein, the lignin has a mass average molar mass ($M_W$) less than 2,500 Da as measured by gel permiation chromatography (GPC); and a number average molar mass ($M_N$) less than 1,000 Da as measured by gel permiation chromatography (GPC). In some embodiments of the lignin described herein, the consistent glass transition temperature (Tg) is determined by two consecutive differential scanning calorimetry (DSC) runs of the same lignin portion according to DIN 53765-1994, wherein a first Tg is measured during the first DSC run, a second Tg is measured during the second DSC run, and the difference between the first Tg and the second Tg is less than 10° C. In some embodiments of the compositions described herein, the difference between the first Tg and the second Tg is less than 5° C.

In some embodiments of the lignin compositions described herein, the lignin is substantially soluble when a first amount of lignin is agitated for 2 hours at room temperature in the presence of an amount of organic solvent to form a second amount of solubilized lignin and third amount of insoluble lignin, wherein the ratio of the second amount to the third amount of lignin is greater than 1.0, 1.1, 1.2, 1.3, 1.4, 1.5, 1.6, 1.7, 1.8, 1.9, 2.0, 2.2, 2.4, 2.6, 3, 4, 5, 6, 7, 8, 9, 10, or 20 to 1 (wt/wt), and wherein the ratio of the amount of organic solvent to the first amount of lignin is 5:1 (wt/wt).

In some embodiments of the lignin compositions described herein, the lignin is substantially soluble when a first amount of lignin is agitated for 2 hours at room temperature in the presence of an amount of organic solvent to form a second amount of solubilized lignin and third amount of insoluble lignin, wherein greater than 95, 90, 85, 80, 75, 70, 65, 60, 55, or 50% of the first amount of lignin is dissolved in the organic solvent, and wherein the ratio of the amount of organic solvent to the first amount of lignin is 5:1 (wt/wt).

In some embodiments of the lignin compositions described herein, the lignin is substantially insoluble when a first amount of lignin is agitated for 2 hours at room temperature in the presence of an amount of organic solvent to form a second amount of solubilized lignin and third amount of insoluble lignin, wherein the ratio of the third amount to the second amount of lignin is greater than 1.0, 1.1, 1.2, 1.3, 1.4, 1.5, 1.6, 1.7, 1.8, 1.9, 2.0, 2.2, 2.4, 2.6, 3, 4, 5, 6, 7, 8, 9, 10, or 20 to 1 (wt/wt), and wherein the ratio of the amount of organic solvent to the first amount of lignin is 5:1 (wt/wt).

In some embodiments of the lignin compositions described herein, the lignin is substantially insoluble when a first amount of lignin is agitated for 2 hours at room temperature in the presence of an amount of organic solvent to form a second amount of solubilized lignin and third amount of insoluble lignin, wherein greater than 95, 90, 85, 80, 75, 70, 65, 60, 55, or 50% of the first amount of lignin is not dissolved in the organic solvent, and wherein the ratio of the amount of organic solvent to the first amount of lignin is 5:1 (wt/wt).

In some embodiments the marker molecule is selected from the group consisting of isopropanol, ethyl acetate, ethyl formate, dichloromethane, hexanol, furfural, hydroxymethyl furfural, 2,3,5 trimethyl furan, p-hydroxyphenoxyacetic acid, 4-hydroxy-3,5,-dimethoxyphenyl) acetic acid, methylethyl ketone, Methylpropenyl ketone, 3-(2-furyl)-3-penten-2-one, 3-methyl-2-penten-4-one, 3,4-dimethyl-4-hexene-one, 5-ethyl-5-hexene-3-one, 5-methyl-4-heptene-3-one, o-hydroxyanisole, 3-ethyl-4-methyl-3-penten-2-one, 3,4,4-trimethyl-2-cyclohexene-1-one, 2'-hydroxy-4',5'-dimethylacetophenone, 1-(4-hydroxy-3-methoxyphenyl)propane methanol, galcturonic acid, dehydroabietic acid, glycerol, fatty acids and resin acids. In some embodiments, the organic solvent is selected from a group consisting of methanol, ethanol, isopropanol, ethyl acetate, ethyl formate, dichloromethane and any mixture thereof. Further provided is a composition comprising up to 50, 40, 30, 20, 10, 5, or 1% wt/wt of at least one of the lignin compositions described herein. In some embodiments, the composition is a polymer, precursor to one or more commodity chemicals, a commodity chemical, or consumer good. In some embodiments, the composition is selected from the group consisting of fuel additives in gasoline or diesel fuel, carbon-fiber, materials for carbon-fiber production, asphalt, a component of a biopolymer, oil well drilling additives, concrete additives, dyestuffs dispersants, agriculture chemicals, animal feeds, industrial binders, specialty polymers for paper industry, precious metal recovery aids, materials for wood preservation, sulfur-free lignin products, automotive brakes, wood panel products, bio-dispersants, polyurethane foams, epoxy resins, printed circuit boards, emulsifiers, sequestrants, water treatment formulations, strength additive for wallboard, adhesives, and a material for the production of vanillin, xylitol, paracoumaryl, coniferyl, sinapyl alcohol, benzene, xylenes, or toluene.

In another aspect, the invention is a method for fractionating lignin comprising: i) contacting a sample comprising solid lignin with an organic solvent to form a resulting biphasic mixture, wherein the mixture comprises: a) a remainder solid designated as solvent insoluble (SI) fraction comprising a first fraction of the lignin; and b) a liquid solution comprising the solvent and a second fraction of the lignin, wherein the second fraction is designated as solvent soluble (SS) lignin fraction; and ii) spacially separating the (SI) lignin fraction from the (SS) lignin fraction; wherein the first fraction of lignin and second fraction of lignin have different glass transition temperatures.

Further provided is a method for producing high purity lignin from a biomass, comprising: (i) removing hemicellulose sugars from the biomass thereby obtaining a lignin-containing remainder; wherein the lignin-containing remainder comprises lignin and cellulose; (ii) contacting the lignin-containing remainder with a lignin extraction solution to produce a lignin extract and a cellulosic remainder; wherein the lignin extraction solution comprises a limited-solubility solvent, an organic acid, and water, wherein the limited-solubility solvent and water form an organic phase and an aqueous phase; and (iii) separating the lignin extract from the cellulosic remainder; wherein the lignin extract comprises lignin dissolved in the limited-solubility solvent; and further comprising one, two, three or four additional step(s): (iv) distilling or flash evaporating the lignin extract thereby removing the bulk of the limited-solubility solvent from the lignin extract to obtain a solid lignin; (v) heating the solid lignin thereby removing trace limited-solubility solvent or water from the solid lignin; (vi) applying a vacuum to the solid lignin thereby removing trace limited-solubility solvent or water from the solid lignin; and (vii) contacting a sample comprising solid lignin with an organic solvent to form a resulting biphasic mixture, wherein the mixture comprises: a) a remainder solid designated as solvent insoluble (SI) fraction comprising a first fraction of the lignin; and b) a liquid solution comprising the solvent and a second fraction of the lignin, wherein the second fraction is designated as solvent soluble (SS) lignin fraction; and ii) spacially separating the (SI) lignin fraction from the (SS) lignin fraction; wherein the first fraction of lignin and second fraction of lignin have different glass transition temperatures. In some embodiments of the methods disclosed herein, the solvent comprises at least one organic molecule having up to 5 carbon atoms and at least one heteroatom; wherein the contacting occurs at 20-50° C. for 1 to 10 hours; wherein the spatial separating comprises filtration or decantation of the solvent from the insoluble lignin; and the method further comprises: (iii) evaporating the solvent from the (SS) lignin fraction; and (iv) drying each fraction to obtain a dry solid (SS) lignin fraction and a dry solid (SI) lignin fraction; wherein the two dry solid lignin fractions have different molecular weights as determined by GPC and different consistent glass transition temperatures. In some embodiments of the methods disclosed herein, at least one of the lignin fractions has a consistent glass transition temperature (Tg) as determined by two differential scanning calorimetry (DSC) runs of the same lignin portion in a single day according to DIN 53765-1994, wherein a first Tg is measured during the first DSC run, a second Tg is measured during the second DSC run, and the difference between the first Tg and the second Tg is less than 5° C. In some embodiments, the (SS) lignin fraction has a different consistent glass transition temperature than the (SI) lignin fraction. In some embodiments, the solvent is selected from a group consisting of methanol, ethanol, isopropanol, ethyl acetate, ethyl formate, dichloromethane, and any mixture thereof.

Also provided is a method comprising: (i) providing a lignin composition described herein, and (ii) converting at least a portion of lignin in the composition to a conversion product. In some embodiments, the converting comprises treating with hydrogen or a hydrogen donor. In some embodiments, the conversion product comprises a commodity chemical comprising at least one item selected from the group consisting of bio-oil, carboxylic and fatty acids, dicarboxylic acids, hydroxyl-carboxylic, hydroxyl di-carboxylic acids and hydroxyl-fatty acids, methylglyoxal, mono-, di- or poly-alcohols, alkanes, alkenes, aromatics, aldehydes, ketones, esters, phenols, benzene, toluenes, and xylenes. In some embodiments, the conversion product is selected from the group consisting of dispersants, emulsifiers, complexants, flocculants, agglomerants, pelletizing additives, resins, carbon fibers, active carbon, antioxidants, liquid fuel, aromatic chemicals, vanillin, adhesives, binders, absorbents, toxin binders, foams, coatings, films, rubbers and elastomers, sequestrants, fuels, and expanders. In some embodiments, the conversion product comprises a fuel or a fuel ingredient.

DETAILED DESCRIPTION OF THE INVENTION

Introduction

Figure 1:
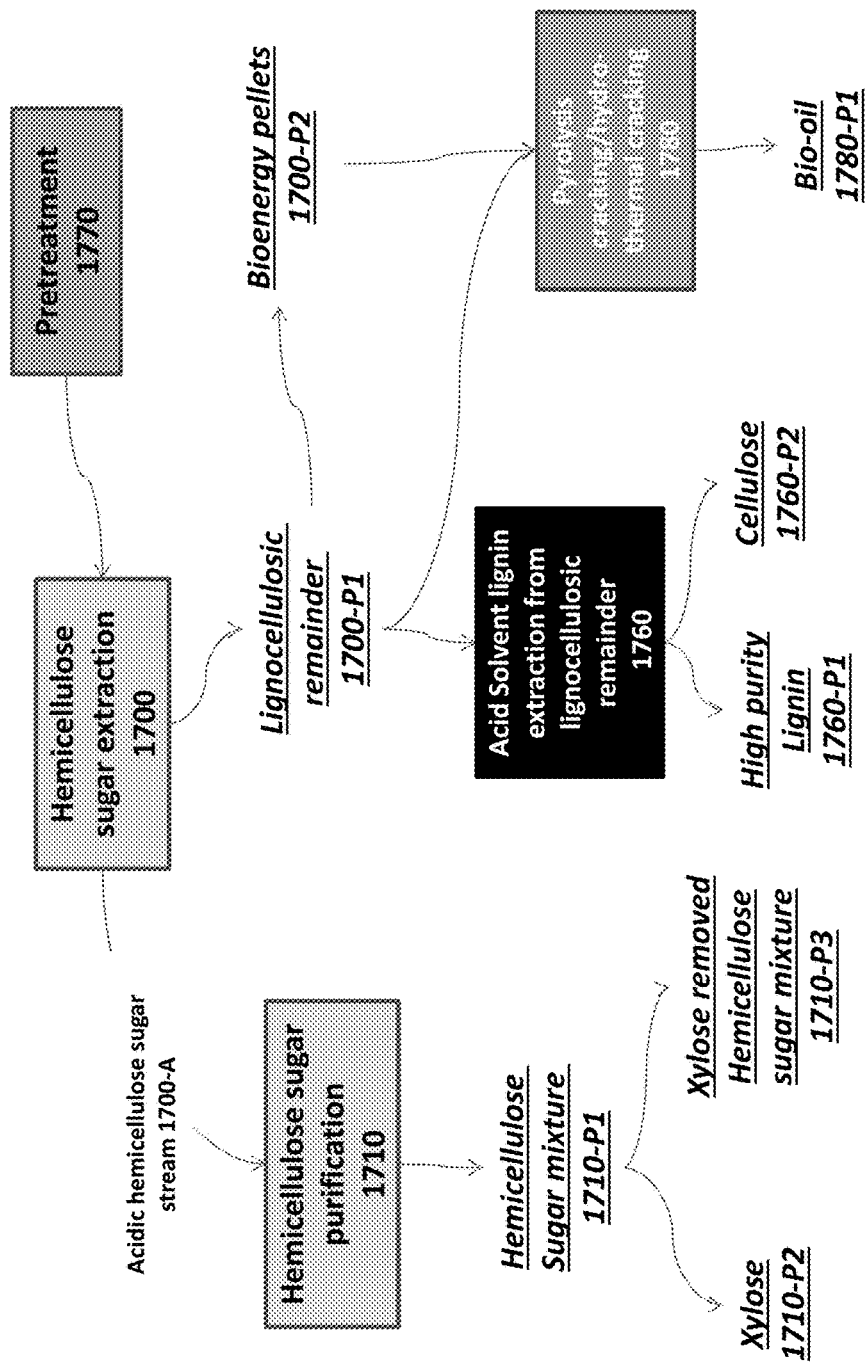
FIG. 1 is a schematic representation of an exemplary method of treating lignocellulosic biomass material according to some embodiments of the present invention.
Figure 2:
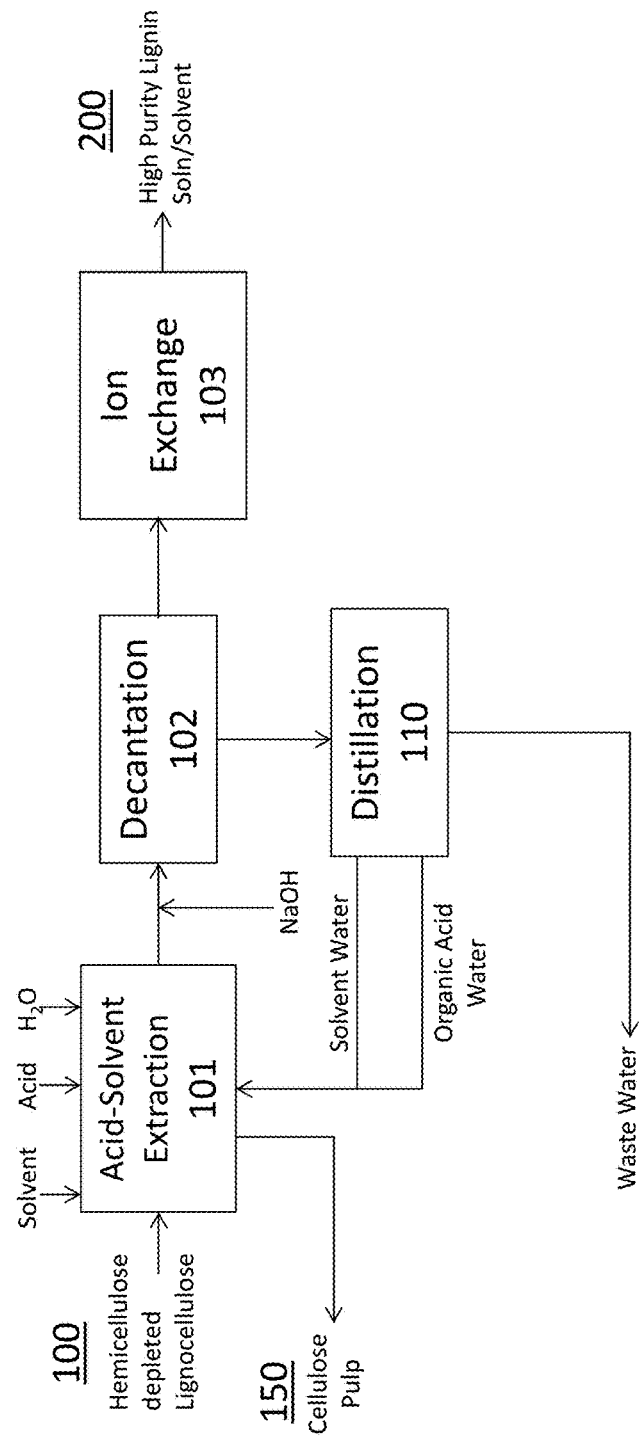
FIG. 2 is a schematic description of a process for acid-solvent extraction of lignin from hemicellulose depleted lignocellulose matter and for the refining of the solvent-soluble lignin. This process results in stream 200, comprising the solvent and dissolved lignin, where residual ash is less than 1000 ppm, preferably less than 500 ppm, wherein polyvalent cations are less than 500 ppm, preferably less than 200 ppm relative to lignin (on dry base) and residual carbohydrate is less than 500 ppm relative to lignin (on dry base). The solution is free of particulate matter.

Technology, methods, and processes to efficiently extract lignin from lignocellulose feedstocks are disclosed by Jansen et. al. in PCT/2013/039585 and PCT/US2013/068824. An overview of the lignocellulosic biomass processing and refining according to embodiments disclosed herein is provided in FIG. 1. In general, the lignocellulosic biomass processing and refining processes include: (1) pre-treatment 1770; (2) hemicellulose sugar extraction 1700 and purification 1710; and (5) direct lignin extraction 1760.

The lignocellulosic biomass processing and refining begins with pretreatment 1770, during which the lignocellulosic biomass can be, for example, debarked, chipped, shredded, dried, or grinded to particles.

During hemicellulose sugar extraction 1700, the hemicellulose sugars are extracted from the lignocellulosic biomass, forming an acidic hemicellulose sugar stream 1700A and a lignocellulosic remainder stream 1700B. The lignocellulosic remainder stream 1700B consists of mostly cellulose and lignin.

In some methods, the lignocellulosic remainder 1700-B can be processed to extract lignin. This process produces a high purity lignin 1760-P1 and a high purity cellulose 1760-P2. The novel lignin purification process of the invention utilizes a limited-solubility solvent, and can produce a lignin having a purity greater than 99%.

I. Pretreatment

Prior to hemicellulose sugar extraction 1700, lignocellulosic biomass can be optionally pre-treated. Pretreatment refers to the reduction in biomass size (e.g., mechanical breakdown or evaporation), which does not substantially affect the lignin, cellulose and hemicellulose compositions of the biomass. Pretreatment facilitates more efficient and economical processing of a downstream process (e.g., hemicellulose sugar extraction). Preferably, lignocellulosic biomass is debarked, chipped, shredded and/or dried to obtain pre-treated lignocellulosic biomass. Pretreatment can also utilize, for example, ultrasonic energy or hydrothermal treatments including water, heat, steam or pressurized steam. Pretreatment can occur or be deployed in various types of containers, reactors, pipes, flow through cells and the like. In some methods, it is preferred to have the lignocellulosic biomass pre-treated before hemicellulose sugar extraction 1700. In some methods, no pre-treatment is required, i.e., lignocellulosic biomass can be used directly in the hemicellulose sugar extraction 1700.

Optionally, lignocellulosic biomass can be milled or grinded to reduce particle size. In some embodiments, the lignocellulosic biomass is grinded such that the average size of the particles is in the range of 100-10,000 micron, preferably 400-5,000, e.g., 100-400, 400-1,000, 1,000-3,000, 3,000-5,000, or 5,000-10,000 microns. In some embodiments, the lignocellulosic biomass is grinded such that the average size of the particles is less than 10,000, 9,000, 8,000, 7,000, 6,000, 5,000, 4,000, 3,000, 1,000, or 400.

II. Hemicellulose Sugar Extraction

The present invention provides an advantageous method of extracting hemicellulose sugars from lignocellulosic biomass (hemicellulose sugar extraction 1700). Preferably, an aqueous acidic solution is used to extract lignocellulose biomass. The aqueous acidic solution can contain any acids, inorganic or organic. Preferably, an inorganic acid is used. For example, the solution can be an acidic aqueous solution containing an inorganic or organic acid such as $H_2SO_4$, $H_2SO_3$ (which can be introduced as dissolved acid or as $SO_2$ gas), HCl, and acetic acid. The acidic aqueous solution can contain an acid in an amount of 0 to 2% acid or more, e.g., 0-0.2%, 0.2-0.4%, 0.4-0.6%, 0.6-0.8%, 0.8-1.0%, 1.0-1.2%, 1.2-1.4%, 1.4-1.6%, 1.6-1.8%, 1.8-2.0% or more weight/weight. Preferably, the aqueous solution for the extraction includes 0.2-0.7% $H_2SO_4$ and 0-3,000 ppm $SO_2$. The pH of the acidic aqueous solution can be, for example, in the range of 1-5, preferably 1-3.5.

In some embodiments, an elevated temperature or pressure is preferred in the extraction. For example, a temperature in the range of 100-200° C., or more than 50° C., 60° C., 70° C., 80° C., 90° C., 100° C., 110° C., 120° C., 130° C., 140° C., 150° C., 160° C., 170° C., 180° C., 190° C., or 200° C. can be used. Preferably, the temperature is in the range of 110-160° C., or 120-150° C. The pressure can be in the range of 1-10 mPa, preferably, 1-5 mPa. The solution can be heated for 0.5-5 hours, preferably 0.5-3 hours, 0.5-1 hour, 1-2 hours, or 2-3 hours, optionally with a cooling down period of one hour.

Impurities such as ash, acid soluble lignin, fatty acids, organic acids such as acetic acid and formic acid, methanol, proteins and/or amino acids, glycerol, sterols, rosin acid and waxy materials can be extracted together with the hemicellulose sugars under the same conditions. These impurities can be separated from the aqueous phase by solvent extraction (e.g., using a solvent containing amine and alcohol).

After the hemicellulose sugar extraction 1700, the lignocellulosic remainder stream 1700-B can be separated from the acidic hemicellulose sugar steam 1700-A by any relevant means, including, filtration, centrifugation or sedimentation to form a liquid stream and a solid stream. The acidic hemicellulose sugar steam 1700-A contains hemicellulose sugars and impurities. The lignocellulosic remainder stream 1700-B contains predominantly cellulose and lignin.

The lignocellulosic remainder stream 1700-B can be further washed to recover additional hemicellulose sugars and acidic catalyst trapped inside the biomass pores. The recovered solution can be recycled back to the acidic hemicellulose sugar stream 1700-A, or recycled back to the hemicellulose sugar extraction 1700 reactor. The remaining lignocellulosic remainder stream 1700-B can be pressed mechanically to increase solid contents (e.g., dry solid contents 40-60%). Filtrate from the pressing step can be recycled back to the acidic hemicellulose sugar stream 1700-A, or recycled back to the hemicellulose sugar extraction 1700 reactor. Optionally, the remaining lignocellulosic remainder 1700-B is grinded to reduce particle sizes. Optionally, the pressed lignocellulosic remainder is then dried to lower the moisture content, e.g., less than 15%. The dried matter can be further processed to extract lignin and cellulose sugars (processes 1720 and 1760 in FIG. 1). Alternatively, the dried matter can be pelletized into pellets 1700-P, which can be burnt as energy source for heat and electricity production or can be used as feedstock for conversion to bio oil.

The lignocellulosic remainder stream 1700-B can be further processed to extract lignin (process 1760 in FIG. 1). Prior to the lignin extraction, the lignocellulosic remainder stream 1700-B can be separated, washed, and pressed as described above.

III. Lignin Extraction from Lignocellulosic Biomass

As discussed above in connection with hemicellulose sugars extraction, the present invention in one aspect provides a novel method of extracting lignin directly from lignocellulosic biomass after hemicellulose sugars are extracted. The method utilizes a limited-solubility solvent, and works well with biomass particles of various sizes. Therefore, it is not necessary to grind the particles prior to lignin extraction.

The extraction of hemicellulose sugars from the biomass results in a lignin-containing remainder. In some methods, the extraction of hemicellulose sugars does not remove a substantial amount of the cellulosic sugars. For example, the extraction of hemicellulose sugars does not remove more than 1, 2, 5, 10, 15, 20, 30, 40, 50, 60% weight/weight cellulose. In some methods, the lignin-containing remainder contains lignin and cellulose. In some methods, the lignin-containing remainder contains less than 50, 45, 40, 35, 30, 25, 20, 15, 10, 5, 2, 1% hemicellulose. In some embodiments, the lignin can be directly extracted from lignocellulosic biomass without removing hemicellulose sugars.

The lignin extraction solution contains a limited-solubility solvent, an acid, and water. Examples of limited-solubility solvents suitable for the present invention include methylethylketone, diethylketone, methyl isopropyl ketone, methyl propyl ketone, mesityl oxide, diacetyl, 2,3-pentanedione, 2,4-pentanedione, 2,5-dimethylfuran, 2-methylfuran, 2-ethylfuran, 1-chloro-2-butanone, methyl tert-butyl ether, diisopropyl ether, anisol, ethyl acetate, methyl acetate, ethyl formate, isopropyl acetate, propyl acetate, propyl formate, isopropyl formate, 2-phenylethanol, toluene, 1-phenylethanol, phenol, m-cresol, 2-phenylethyl chloride, 2-methyl-2H-furan-3-one, γ-butyrolactone, acetal, methyl ethyl acetal, dimethyl acetal, morpholine, pyrrol, 2-picoline, 2,5-dimethylpyridine. In some embodiments, the limited-solubility solvent includes one or more of esters, ethers and ketones with 4 to 8 carbon atoms. For example, the limited-solubility solvent can include ethyl acetate. In some embodiments, the limited-solubility solvent consists essentially of, or consists of, ethyl acetate.

The ratio of the limited-solubility solvent to water suitable for carrying out the lignin extraction can vary depending on the biomass material and the particular limited-solubility solvent used. In general, the solvent to water ratio is in the range of 100:1 to 1:100, e.g., 50:1-1:50, 20:1 to 1:20, and preferably 1:1.

Various inorganic and organic acids can be used for lignin extraction. For example, the solution can contain an inorganic or organic acid such as $H_2SO_4$, HCl, acetic acid and formic acid. The acidic aqueous solution can contain 0 to 10% acid or more, e.g., 0-0.4%, 0.4-0.6%, 0.6-1.0%, 1.0-2.0%, 2.0-3.0%, 3.0-4.0%, 4.0-5.0% or more. Preferably, the aqueous solution for the extraction and hydrolysis includes 0.6-5%, preferably 1.2-1.5% acetic acid. The pH of the acidic aqueous solution can be, for example, in the range of 0-6.5.

Elevated temperatures and/or pressures are preferred in lignin extraction. For example, the temperature of lignin extraction can be in the range of 50-300° C., preferably 160 to 200° C., e.g., 175-185° C. The pressure can be in the range of 1-10 mPa, preferably, 1-5 mPa. The solution can be heated for 0.5-24 hours, preferably 1-3 hours.

In some embodiments, the pH of the solvent is adjusted to 3.0 to 4.5 (e.g., 3.5-3.8). At this pH range, the lignin is protonated and is easily extracted into the organic phase. The organic phase comprising solvent and lignin is contacted with strong acid cation exchanger to remove residual metal cations. To obtain high purity solid lignin, the limited-solubility solvent is separated from lignin, e.g., evaporated. Preferably, the limited-solubility solvent can be separated from lignin by mixing the solvent solution containing acidic lignin with water at an elevated temperature (e.g., 80° C.). The precipitated lignin can be recovered by, e.g., filtration or centrifugation. The solid lignin can be dissolved in any suitable solvents (e.g., phenylethyl alcohol) for making lignin solutions.

Alternatively, the limited-solubility solvent solution containing acidic lignin can be mixed with another solvent (e.g., toluene). The limited-solubility solvent can be evaporated whereas the replacement solvent (e.g., toluene) stays in the solution. A lignin solution in a desired solvent can be prepared.

The invention further provides a lignin composition produced by a process of producing high purity lignin from a biomass. The process comprises (i) removing hemicellulose sugars from the biomass thereby obtaining a lignin-containing remainder; wherein the lignin-containing remainder comprises lignin and cellulose; (ii) contacting the lignin-containing remainder with a lignin extraction solution to produce a lignin extract and a cellulosic remainder; wherein the lignin extraction solution comprises a limited-solubility solvent, an organic acid, and water, wherein the limited-solubility solvent and water form an organic phase and an aqueous phase; and (iii) separating the lignin extract from the cellulosic remainder; wherein the lignin extract comprises lignin dissolved in the limited-solubility solvent. In some embodiments, the lignin composition is produced by a process that further comprises one, two, three, four, or five additional step(s): (iv) contacting the lignin extract with a strong acid cation exchanger to remove residual cations thereby obtaining a purified lignin extract (v) distilling or flash evaporating the lignin extract thereby removing the bulk of the limited-solubility solvent from the lignin extract to obtain solid lignin; (vi) heating the solid lignin thereby removing trace limited-solubility solvent or water from the solid lignin; (vii) applying a vacuum to the solid lignin thereby removing trace limited-solubility solvent or water from the solid lignin; and (viii) dissolving the solid lignin with an organic solvent to form a resulting solution and separating the resulting solution from insoluble remainder.

In some embodiments, the lignin composition is characterized by at least one, two, three, four, five, six, seven, eight, nine, ten, eleven, twelve, thirteen, fourteen, fifteen, sixteen, seventeen, eighteen, or nineteen characteristics selected from the group consisting of: (i) lignin aliphatic hydroxyl group in an amount up to 2 mmole/g; (ii) at least 2.5 mmole/g lignin phenolic hydroxyl group; (iii) less than 0.40 mmole/g lignin carboxylic OH group; (iv) sulfur in an amount up to 1% weight/weight; (v) nitrogen in an amount up to 0.5% weight/weight; (vi) 5% degradation temperature higher than 220° C.; (vii) 10% degradation temperature higher than 260° C.; (viii) less than 1% ash weight/weight; (ix) a formula of $C_aH_bO_c$; wherein a is 9, b is less than 12 and c is less than 3.5; (x) a degree of condensation of less than 0.9; (xi) a methoxyl content of at least 0.8; (xii) an O/C weight ratio of less than 0.4; (xiii) a glass transition elevation between first and second heat cycle according to DIN 53765 in the range of 10 to 30° C.; (xiv) less than 1% carbohydrate weight/weight; (xv) solubility in DMSO is >100 g/L; (xvi) solubility in THF is >35 g/L; (xvii) solubility in 0.1 N NaOH aqueous solution is >8 g/L; (xviii) less than 1% water by weight; and (xix) less than 1% volatile components at 200° C. by weight.

In some embodiments, the lignin composition is further characterized as having a glass transition as determined by Differential Scanning calorimetry (DSC) according to DIN 53765 in the range of 80° C. to 160° C.; the DSC thermogram of the second heating cycle is substantially different from the first heating cycle, where the first heating cycle comprises a greater number of exothermic maxima, endothermic maxima or inflection points than the second cycle. In some embodiments, this greater number of points in the first cycle can be attributed to reactivity of the lignin sample taking place when heated, due to the lignin sample heterogeneity (e.g., a variety of functional groups, molecules structure and molecular weight). In some embodiments, the reactivity results in further cross linking, resulting in elevation of the glass transition of the second cycle by greater than 5° C., 10° C., 15° C., 20° C. or even 25° C.

Such thermal behavior is indicative of the instability of the lignin polymer under heat, and possibly under other conditions. For industrial application purposes of lignin it is desirable not only to have the high purity demonstrated for lignin of this invention but also to have better defined lignin. This is optionally achieved by fractionating the lignin into stable fractions in terms of their thermal behavior, size, structure and other attributes. Stable fractions of lignin will allow development of lignin as feedstock for chemical conversion processes that break the molecule to obtain chemicals of value and/or utilization of the lignin as a polymer by compounding it with additional components.

IV. Lignin Fractionation

Surprisingly it was found that said lignin can be fractionated by a robust method to produce two distinct lignin fractions that are thermally stable and are distinctively different. Thus the invention further provides a lignin composition produced by a process of producing high purity lignin from a biomass. The process comprises (i) removing hemicellulose sugars from the biomass thereby obtaining a lignin-containing remainder; wherein the lignin-containing remainder comprises lignin and cellulose; (ii) contacting the lignin-containing remainder with a lignin extraction solution to produce a lignin extract and a cellulosic remainder; wherein the lignin extraction solution comprises a limited-solubility solvent, an organic acid, and water, wherein the limited-solubility solvent and water form an organic phase and an aqueous phase; and (iii) separating the lignin extract from the cellulosic remainder; wherein the lignin extract comprises lignin dissolved in the limited-solubility solvent. In some embodiments, the lignin composition is produced by a process that further comprises one, two, three, four, or five additional step(s): (iv) contacting the lignin extract with a strong acid cation exchanger to remove residual cations thereby obtaining a purified lignin extract (v) distilling or flash evaporating the lignin extract thereby removing the bulk of the limited-solubility solvent from the lignin extract to obtain solid lignin; (vi) heating the solid lignin thereby removing trace limited-solubility solvent or water from the solid lignin; (vii) applying a vacuum to the solid lignin thereby removing trace limited-solubility solvent or water from the solid lignin; and (viii) contacting the solid lignin with an organic solvent to form a resulting solution comprising a fraction of the lignin, designated as solvent soluble (SS) and a remainder solid designated as solvent insoluble (SI); and separating the resulting solution from insoluble remainder.

Solvent fractionation can separate a sample of lignin into a solvent soluble (SS) fraction and solvent insoluble (SI) fraction. In some embodiments, said contacting is conducted at a ratio of 1:3 to 1:10 solid to liquid ratio (wt/wt), in a stirred container at 20-50° C. for 1-10 h.

In some embodiments, the solvent is at least one polar organic solvent with a molecular weight less than 200 Da. In some embodiments, the solvent is at least one organic solvent comprising 1-5 carbon atoms, 0-3 oxygen atoms, and 0-6 halogen atoms. In some embodiments, the solvent is a mixture of organic solvents. In some embodiments, the solvent is selected as an organic molecule wherein lignin has limited solubility in the solvent. For example, in some embodiments, the solvent is selected so that a mixture of the solvent to lignin 5:1 w/w results in solubilization of at least 5, 10, 15, 20, 25, 30, 35, 40, 45, 50% of lignin is disolved in the solvent. In some embodiments, between 10 and 40% of lignin is dissolved in the solvent. In some embodiments, lignin a solubility in the solvent of at least 1, 2, 3, 4, 5, 6, 7, 8, 9, 10, 15, 20, 25, 30, 35, 40, 45, 50, 60, 70, 80, 85, 80, 95, 97, 98, 99 gram sample/500 gram solvent under the described conditions. In some embodiments, the solvent is an organic molecule wherein a sample consisting essentially of lignin has a solubility in the solvent of at least 1, 2, 3, 4, 5, 6, 7, 8, 9, 10, 15, 20, 25, 30, 35, 40, 45, 50, 60,70, 80, 85, 80, 95, 97, 98, 99 gram sample/500 gram solvent under the described conditions. In some embodiments, a mixture of solvents is applied. In some embodiments, at least 30%, 40%, 50%, 60% wt/wt of the lignin solid is soluble in said solvent under the described conditions, but not more than 70%, 60%, 50%, 40% is soluble. In some embodiments, the solvent is selected to form a soluble lignin fraction is at least 2, 4, 6, 8, 10, 12, 16, 20, 24, 28, 32, 36, 40, 44, 48, 50, 52 wt/wt % of the total lignin in the sample under the solvent fractionation conditions described herein.

In some embodiments, the solvent is selected from a group consisting of methanol, ethanol, isopropanol, ethyl acetate, ethyl formate and dichloromethane. In some embodiments, the solvent is selected from a group consisting of methanol, ethyl acetate and dichloromethane. In some embodiments, the solvent is methanol. In some embodiments, the solvent is dichloromethane. In some embodiments, the solvent is ethyl acetate.

In some embodiments, the non-dissolved fraction is collected by filtration, washed and air dried at 100-110° C. or under vacuum at 45-55° C. The dissolved fraction is dried by evaporating the solvent or the solvent mixture in a rotavap or any other method to evaporate a solvent. The remaining lignin is collected and air dried at 100-110° C. or under vacuum at 45-55° C. In some embodiments, the solvent insoluble fraction is collected by decantation of the solvent from the reactor. In some embodiments, the solvent soluble fraction is collected by decantation of the solvent away from the solvent insoluble fraction.

The method of solvent fractionation of a lignin sample can be selected such that the amount of lignin in the solvent soluble fraction is low relative to the amount of lignin in the solvent insoluble fraction. For example, in some embodiments of the methods described herein, the solvent soluble fraction comprises less than 65, 60, 50, 45, 40, 35, 30, 25, 20, 15, 10, 5% of the total lignin of the sample (w/w). In some embodiments, the SS fraction comprises between about 25% and 45% of the total lignin. The method of solvent fractionation of a lignin sample can be selected such that the amount of lignin in the solvent insoluble (SI) fraction is low relative to the amount of lignin in the solvent soluble (SS) fraction. For example, in some embodiments of the methods described herein, the solvent insoluble fraction comprises less than 65, 60, 50, 45, 40, 35, 30, 25, 20, 15, 10, 5% of the total lignin of the sample (w/w). In some embodiments, the SI fraction comprises between about 25% and 45% of the total lignin.

In some embodiments of the lignin compositions described herein, the lignin is substantially soluble when a first amount of lignin is agitated for 2 hours at room temperature in the presence of an amount of organic solvent to form a second amount of solubilized lignin and third amount of insoluble lignin, wherein the ratio of the second amount to the third amount of lignin is greater than 1.0, 1.1, 1.2, 1.3, 1.4, 1.5, 1.6, 1.7, 1.8, 1.9, 2.0, 2.2, 2.4, 2.6, 3, 4, 5, 6, 7, 8, 9, 10, or 20 to 1 (wt/wt), and wherein the ratio of the amount of organic solvent to the first amount of lignin is 5:1 (wt/wt). In some embodiments of the lignin compositions described herein, the lignin is substantially soluble when a first amount of lignin is agitated for 2 hours at room temperature in the presence of an amount of organic solvent to form a second amount of solubilized lignin and third amount of insoluble lignin, wherein the ratio of the second amount to the third amount of lignin is greater than 3:1 (wt/wt), and wherein the ratio of the amount of organic solvent to the first amount of lignin is 5:1 (wt/wt).

In some embodiments of the lignin compositions described herein, the lignin is substantially soluble when a first amount of lignin is agitated for 2 hours at room temperature in the presence of an amount of organic solvent to form a second amount of solubilized lignin and third amount of insoluble lignin, wherein greater than 95, 90, 85, 80, 75, 70, 65, 60, 55, or 50% of the first amount of lignin is dissolved in the organic solvent, and wherein the ratio of the amount of organic solvent to the first amount of lignin is 5:1 (wt/wt).

In some embodiments of the lignin compositions described herein, the lignin is substantially insoluble when a first amount of lignin is agitated for 2 hours at room temperature in the presence of an amount of organic solvent to form a second amount of solubilized lignin and third amount of insoluble lignin, wherein the ratio of the third amount to the second amount of lignin is greater than 1.0, 1.1, 1.2, 1.3, 1.4, 1.5, 1.6, 1.7, 1.8, 1.9, 2.0, 2.2, 2.4, 2.6, 3, 4, 5, 6, 7, 8, 9, 10, or 20 to 1 (wt/wt), and wherein the ratio of the amount of organic solvent to the first amount of lignin is 5:1 (wt/wt).

In some embodiments of the lignin compositions described herein, the lignin is substantially insoluble when a first amount of lignin is agitated for 2 hours at room temperature in the presence of an amount of organic solvent to form a second amount of solubilized lignin and third amount of insoluble lignin, wherein the ratio of the third amount to the second amount of lignin is greater than 3:1 (wt/wt), and wherein the ratio of the amount of organic solvent to the first amount of lignin is 5:1 (wt/wt).

In some embodiments of the lignin compositions described herein, the lignin is substantially insoluble when a first amount of lignin is agitated for 2 hours at room temperature in the presence of an amount of organic solvent to form a second amount of solubilized lignin and third amount of insoluble lignin, wherein greater than 95, 90, 85, 80, 75, 70, 65, 60, 55, or 50% of the first amount of lignin is not dissolved in the organic solvent, and wherein the ratio of the amount of organic solvent to the first amount of lignin is 5:1 (wt/wt).

Solvent fractionation can produce two or more fractions of lignin with different chemical compositions than non-fractionated lignin. The chemical composition of each fraction of solvent fractionated lignin can be distinct from non-fractionated lignin and distinct from each other fraction. For example, the solvent soluble and/or solvent insoluble lignin fractions can each have a ratio of oxygen to carbon atoms (O/C) larger than the O/C ratio of non-fractionated lignin. The solvent soluble and/or solvent insoluble lignin fractions can each have a ratio of hydrogen to carbon atoms (H/C) smaller than the H/C ratio of non-fractionated lignin. In some embodiments, the O/C and H/C ratios of fractionated lignin are within 20, 18, 15, 12, 10, 5% of non-fractionated lignin.

The chemical composition of each fraction of solvent fractionated lignin can be distinct from non-fractionated lignin. For example, the number of OH groups (mmol/g lignin) can be higher in fractionated lignin than in non-fractionated lignin. In some embodiments, the number of aliphatic, phenolic, and carboxylic OH groups (mmol/g lignin) can be higher in fractionated lignin than in non-fractionated lignin. In some embodiments, the SS fraction comprises more phenolic OH and carboxylic OH groups than the SI fraction (w/w).

The solvent-soluble (SS) and solvent insoluble (SI) fractions obtained by this process share the high purity of the lignin solid from which they were made. The two samples are distinctively different in molecular weight, as demonstrated by characterizing them side by side by the same gel permeation method.

In some embodiments, the solvent soluble (SS) lignin fraction obtained by the process described herein has a low glass transition temperature (Tg) as determined using differential scanning calorimetry (DSC) according to DIN 53765-1994. For example, the SS fraction can have a measured Tg below the Tg of non-fractionated lignin. The SS fraction can have a Tg less than 95, 90, 85, 80, 75, 70, 65, 60, 55, 50, or 45° C. The Tg of non-fractionated lignin can be in the range of 80 to 160° C. The SS fraction can have a Tg less than, 90, 85, 80, 75, 70, 65, or 60° C. In some embodiments, the SS fraction has a Tg between about 75 and about 110° C. In some embodiments, the SS fraction has a Tg between about 75 and about 95° C. For example, the SS fraction can have a measured Tg below the Tg of solvent insoluble (SI) lignin fraction. The SS fraction can have a Tg less than 95, 90, 85, 80, 75, 70, 65, 60, 55, 50, or 45% of the Tg of solvent insoluble (SI) lignin fraction. In some embodiments, the Tg of the SS lignin fraction is stable. In some embodiments, the Tg of the SS lignin fraction varies between the $1^{st}$ cycle and the $2^{nd}$ cycle by less than 15, 14, 13, 12, 11, 10, 9, 8, 7, 6, 5, 4, 3, 2, or 1° C. In some embodiments, the Tg of the $2^{nd}$ cycle increases by less than 5° C. relative to the $1^{st}$ cycle wherein the $1^{st}$ and $2^{nd}$ DIN cycle are measured within 7, 6, 5, 4, 3, 2, 1, 0.5, or 0.1 days of each other. In some embodiments, the SS fraction does not have Tg at a temperature above room temperature. In some embodiments, the SS fraction is not a polymer.

In some embodiments, the number average molar mass (Mn) of the SS lignin fraction is less than the Mn of non-fractionated lignin. In some embodiments, the Mn of the SS lignin fraction is less than 2000, 1500, 1000, 900, 800, 700, 600, 500, 400, 300, or 200 Da. Molar mass values disclosed in this invention are determined according to Asikkala et. al., *Journal of agricultural and food chemistry*, 2012, 60(36), 8968-73. In some embodiments, the polydispersity (PD) of the SS lignin fraction is higher than the polydispersity of non-fractionated lignin. In some embodiments, the PD of the SS fraction is over 3.0, 3.5, 4.0, 4.5, or 5.0. In some embodiments, the weight average molar mass or mass average molar mass (Mw) of the solvent soluble (SS) lignin fraction is lower than the Mw of non-fractionated lignin. For example, the Mw of SS lignin fraction can be less than 95, 90, 85, 80, 75, 70, 65, 60, 55, 50, 45, 40, 35, 30, 25, 20, 15, 10, or 5% of Mw of non-fractionated lignin. In some embodiments, the Mw of SS lignin fraction is less than 3000, 2900, 2800, 2700, 2600, 2500, 2400, 2300, 2200, 2100, 2000, 1800, 1600, 1500, 1400, 1300, 1200, 1100, 1000, 900, 970, or 800 Da. In some embodiments, the Mw is of the SS fraction is less than 2000 Da. In some embodiments, the solvent insoluble (SI) lignin fraction obtained by the process described herein has a low glass transition temperature (Tg) as determined using differential scanning calorimetry (DSC) according to DIN 53765-1994. For example, the SI fraction can have a measured Tg above the Tg of non-fractionated lignin. The SI fraction can have a Tg at more than 100, 105, 110, 115, 120, 125, 130, 135, 140, 145, 150, 155, 160, 175, 180, 200, 220, 240, 250° C. In some embodiments, the Tg of non-fractionated lignin is 80-160° C. The SI fraction can have a Tg higher than 120, 130, 140, 150, 160, 170, 180, 190, 195, or 200° C. In some embodiments, the SI fraction has a Tg between about 145 and about 210° C. In some embodiments, the SI fraction has a Tg between about 155 and about 200° C. For example, the SI fraction can have a measured Tg above the Tg of solvent soluble (SS) lignin fraction. The SI fraction can have a Tg greater 100, 105, 110, 115, 120, 125, 130, 135, 140, 145, 150, 155, 160, 175, 180, 200, 220, 240, 260, 280, or 300% of the Tg of solvent soluble (SS) lignin fraction.

In some embodiments, the Tg of the SI lignin fraction is stable. In some embodiments, the Tg of the SI lignin fraction is varies between the $1^{st}$ cycle and the $2^{nd}$ cycle by less than 15, 14, 13, 12, 11, 10, 9, 8, 7, 6, 5, 4, 3, 2, or 1° C. In some embodiments, the Tg of the $2^{nd}$ cycle increases by less than 5° C. relative to the $1^{st}$ cycle wherein the $1^{st}$ and $2^{nd}$ DIN cycle are measured within 7, 6, 5, 4, 3, 2, 1, 0.5, or 0.1 days of each other. In some embodiments, the Tg of the $2^{nd}$ cycle increases by less than 5° C. relative to the $1^{st}$ cycle wherein the $1^{st}$ and $2^{nd}$ DIN cycle are measured consecutively.

The size of individual polymeric molecules, and the size distribution of molecules in a sample of polymers such as lignin can be measured and understood in terms of the number average molar mass (Mn), the mass average molar mass ($M_W$), and polydispersity. For lignin samples, measured values of Mn and Mw (and thus polydispersity) can be dependent on the experimental conditions. The values disclosed herein for Mn and Mw of lignin samples are based on gel permiation chromatography (GPC), using acetobromination of the lignin, with a solution of LiBr in THF as an eluent and UV detection. In some embodiments, the method of experimental measuring Mn and Mw are disclosed in example 6. In some embodiments, the use of DMSO as eluent without derivatization can lead to unusable measured values of Mn and Mw for a lignin sample. In some embodiments, the number average molar mass (Mn) of the SI lignin fraction is greater than the Mn of non-fractionated lignin. In some embodiments, the Mn of the SI lignin fraction is more than 3000, 3500, 4000, 4500, 5000, 5500, 6000, 6500, 7000, 7500, 8000, 8500, or 9000 Da. In some embodiments, the polydispersity (PD) of the SI lignin fraction is lower than the polydispersity of non-fractionated lignin. In some embodiments, the PD of the SI fraction is less than 2.0, 1.9, 1.8. 1.7, 1.6, 1.5, or 1.4. In some embodiments, the mass average molar mass or weight average molar mass (Mw) of the solvent insoluble (SI) lignin fraction is greater than the Mw of non-fractionated lignin. For example, the Mw of SI lignin fraction can be greater than 1, 1.1, 1.2, 1.3, 1.4, 1.5, 1.6, 1.7, 1.8, 1.9, 2.0, 2.3, 2.5, 3.0, or 3.5 of Mw of non-fractionated lignin. In some embodiments, the Mw of SI lignin fraction is greater than 5000, 6000, 7000, 8000, 10000, 12000, 14000, 16000, 18000, or 20000 Da. In some embodiments, the Mw is of the SI fraction is greater than 6000 Da.

Furthermore, the SS fraction and the SI fraction have a distinctively different glass transition temperature, optionally the difference between the transition temperatures of each fraction is greater than 30° C., 40° C., 50° C., 60° C. Further yet, the glass transition temperature is stable between the first cycle and the second thermal cycle, having a difference of less than 5° C., 4° C., 3° C., 2° C. for each fraction. In some embodiments, the SI fraction does not show additional exotherms or endotherms in the DSC scan, indicating that the polymer is stable and does not react at the temperature range up to 250° C.

V. Lignin Applications

The use of lignin as a precursor for many high value materials was previously disclosed and is reviewed in numerous articles, for example: R. J. Gosselink Ph. D Thesis, Wageningen University (2011) "Lignin as a renewable aromatic resource for the chemical industry"; R. J. Gosselink et al, "Valorization of lignin resulting from biorefineries" (2008), RRB4 Rotterdam; D. A. Bulushev and J. R. H. Ross "Catalysis for conversion of biomass to fuels via pyrolysis and gasification: A review" *Catalysis Today* 171 (2011), p 1-13; A. L. Compere et. al. "Low Cost Carbon Fiber from Renewable Resources" Oak Ridge Labs Report; J. E. Holladay et. al. "Top Value-Added Chemicals from Biomass" Volume II—Results of Screening for Potential Candidates from Biorefinery Lignin, report from Pacific Northwest National Laboratory, October 2007.

The fractionated high purity lignin composition according to embodiments disclosed herein has a more defined character than other lignins. In some embodiments, the SI fraction is a preferred fraction for compounding purposes, due to higher molecular weight, the polymer is not changed by temperature up to 250° C. as seen in the DSC scan. The SS fraction is lower molecular weight and solvent soluble is anticipated to be more suitable for using it as feedstock for cracking lignin to small aromatic molecules of high values. In some embodiments, both the SI fraction and the SS fraction have low oxygen content compared to other lignins, e.g. kraft lignin. In some embodiments, both fractions have low ash content, a low sulfur and/or phosphorous concentration. Such a high purity lignin composition is particularly suitable for use in catalytic reactions by contributing to a reduction in catalyst fouling and/or poisoning. A lignin composition having a low sulfur content is especially desired for use as fuel additives, for example in gasoline or diesel fuel.

Some other potential applications for high purity lignin include carbon-fiber production, asphalt production, and as a component in biopolymers. These uses include, for example, oil well drilling additives, concrete additives, dyestuffs dispersants, agriculture chemicals, animal feeds, industrial binders, specialty polymers for paper industry, precious metal recovery aids, wood preservation, sulfur-free lignin products, automotive brakes, wood panel products, bio-dispersants, polyurethane foams, epoxy resins, printed circuit boards, emulsifiers, sequestrants, water treatment formulations, strength additive for wallboard, adhesives, raw materials for vanillin, xylitol, and as a source for paracoumaryl, coniferyl, sinapyl alcohol.

Further provided is a composition comprising a portion of lignin as disclosed herein and another ingredient. For example, the composition can comprise up to 98, 95, 90, 80, 70, 60, 50, 40, 30, 20, 10, 5, 1% wt/wt the lignin. In some embodiments, the composition comprises up to 50% lignin wt/wt. In some embodiments, the composition comprises between 5% and 75% lignin, or between 10 and 60% lignin wt/wt. In some embodiments, the composition is a polymer, precursor to one or more commodity chemicals, a commodity chemical, or consumer good. For example, the composition can be selected from the group consisting of fuel additives in gasoline or diesel fuel, carbon-fiber, materials for carbon-fiber production, asphalt, a component of a biopolymer, oil well drilling additives, concrete additives, dyestuffs dispersants, agriculture chemicals, animal feeds, industrial binders, specialty polymers for paper industry, precious metal recovery aids, materials for wood preservation, sulfur-free lignin products, automotive brakes, wood panel products, bio-dispersants, polyurethane foams, epoxy resins, printed circuit boards, emulsifiers, sequestrants, water treatment formulations, strength additive for wallboard, adhesives, and a material for the production of vanillin, xylitol, paracoumaryl, coniferyl, sinapyl alcohol, benzene, xylenes, or toluene.

In some embodiments, method is provided comprising: (i) providing a lignin composition as described herein, and (ii) converting at least a portion of lignin in the composition to a conversion product. In some embodiments, the converting comprises treating with hydrogen or a hydrogen donor. In some embodiments, the conversion product comprises a commodity chemical comprising at least one item selected from the group consisting of bio-oil, carboxylic and fatty acids, dicarboxylic acids, hydroxyl-carboxylic, hydroxyl di-carboxylic acids and hydroxyl-fatty acids, methylglyoxal, mono-, di- or poly-alcohols, alkanes, alkenes, aromatics, aldehydes, ketones, esters, phenols, benzene, toluenes, and xylenes. In some embodiments, the conversion product is selected from the group consisting of dispersants, emulsifiers, complexants, flocculants, agglomerants, pelletizing additives, resins, carbon fibers, active carbon, antioxidants, liquid fuel, aromatic chemicals, vanillin, adhesives, binders, absorbents, toxin binders, foams, coatings, films, rubbers and elastomers, sequestrants, fuels, and expanders. In some embodiments, the conversion product comprises a fuel or a fuel ingredient.

EXAMPLES

It is understood that the examples and embodiments described herein are for illustrative purposes only and are not intended to limit the scope of the claimed invention. It is also understood that various modifications or changes in light the examples and embodiments described herein will be suggested to persons skilled in the art and are to be included within the spirit and purview of this application and scope of the appended claims. All publications, patents, and patent applications cited herein are hereby incorporated by reference in their entirety for all purposes.

Example 1

Small Scale Hemicellulose Sugar Extraction

Table 1 provides a summary of chemical analysis of the liquor resulting from hemicellulose sugar extraction of various biomass types. The % monomeric sugar is expressed as % weight out of total sugars weight. All other results are expressed as % weight relative to dry biomass.

All treatments were carried out in a 0.5 L pressure reactor equipped with a stirrer and heating-cooling system. The reactor was charged with the biomass and the liquid at amounts given in the table. The reactor was heated to the temperature indicated in the table, time count was started once the reactor reached 5° C. below the designated temperature. Once the time elapsed, the reactor was cooled down. Solid and liquid were separated, and the content of the obtained liquor was analyzed, all data was back calculated relative to dry biomass weight. HPLC methods were applied to evaluate % Total Sugars in the liquor, % monomeric sugars and % Acetic Acid. The % Degradation product is the sum of % Furfurals (GC or HPLC analysis), % Formic acid (HPLC) and % Levullinic acid (HPLC). Acid Soluble Lignin was analyzed according to NREL TP-510-42627 method.

TABLE 1

Treatment conditions and chemical analysis of the resulting liquor

| Ref# | Biomass Type | Biomass Dry wt, g | Soln. wt. | Acid(s) con. % wt | T ° C. | Time, min | % TS[1]/DB[2] | % DP1[3]/% TS | % AcOH[4]/DB | % Degadation Products[5]/DB | % ASL/DB |
|---|---|---|---|---|---|---|---|---|---|---|---|
| 9114 | Eucalyptus | 45.2 | 198.2 | 0.7[6] | 140 | 40 | 22.4 | NA | 1.7 | NA | NA |
| 5a | Eucalyptus | 33.2 | 199.5 | 0.7[6] | 135 | 90 | 60 | 60 | 21.8 | 91 | 3.6 | 1.3 | 3.5 |
| 9004 | Acacia | 33.7 | 201.8 | 0.7[6] | 145 | 40 | 21.2 | 79 | 3.3 | 0.9 | 2.6 |
| 9012 | Leucaena | 34.1 | 201.3 | 0.7[6] | 145 | 60 | 22.0 | 96 | 3.4 | 1.3 | 2.0 |
| 9018 | EFB | 34.6 | 203.8 | 0.7[6] | 145 | 40 | 25.2 | 79 | 1.3 | 0.7 | 1.2 |
| 9019 | Bagasse | 13.3 | 194.8 | 0.7[6] | 145 | 40 | 29.8 | 96 | 2.5 | 0.7 | 2.5 |
| YHTp83/15 | Pine | 18.1 | 190.5 | 0.7[7] | 160 | 15 | 22.9 | 95 | 0.07 | 1.5 | 0.9 |

[1] % Total Sugars (% TS) measured by HPLC in the liquor
[2] DB—Dry Biomass
[3] % Monomers out of total dissolved sugars measured by HPLC in the liquor
[4] % Acetic Acid measured by HPLC in the liquor
[5] % Degradation Products = % Furfurals + % Formic Acid + % Levullinic Acid. % Furfurals measured by GC or HPLC, % Formic acid and % Levullinic acid measured by HPLC
[6] 0.5% $H_2SO_4$ + 0.2% $SO_2$
[7] 0.7% $H_2SO_4$ + 0.03% Acetic acid Example 2

Large Scale Chemical Analysis of Lignocellulose Matter after Hemicellulose Sugar Extraction Table 2 provides a summary of chemical analysis of various types of biomass after hemicellulose sugar extraction.

Pine (ref A1202102-5): Fresh Loblloly pine chips (145.9 Lb dry wood) were fed into a Rapid Cycle Digester (RDC, Andritz, Springfield, Ohio. An acid aqueous solution (500 Lb) was prepared by adding 0.3% H2SO4 and 0.2% SO2 to water in a separate tank. The solution was heated to 135 C and then added to the digester to cover the wood. The solution was circulated through the wood for 40 minutes while maintaining the temperature. After 60 minutes, the resulting liquor was drained to a liquor tank and using steam the wood was blown to a cyclone to collect the wood (128.3 Lb dry wood) and vent the vapor. The extracted wood was analyzed for sugar content, carbohydrate composition, ash, elements (by ICP), and DCM extractives. The analyses of the hemi depleted lignocellulose material show extraction of 42.4% Arabinan, 10.5% Galactan, 9.6% Xylan, 14.3% Manan, and 11.8% Glucan, indicating that mostly hemicellulose is extracted. Analyses also show 11.6% of "others", including ASL, extractives and ash. The overall fraction of carbohydrates in the remaining solid is not different within the error of the measurement to that of the starting biomass due to this removal of "others". It is however easily notices that the extracted woodchips are darker in color and are more brittle than the fresh biomass.

Pine (ref A1204131-14(K1)): Fresh Loblloly pine chips (145.9 Lb dry wood) were fed into a Rapid Cycle Digester (RDC, Andritz, Springfield, Ohio. An acid aqueous solution (500 Lb) was prepared by adding 0.3% H2SO4 and 0.2% SO2 to water in a separate tank. The solution was heated to 135 C and then added to the digester to cover the wood. The solution was circulated through the wood for 180 minutes while maintaining the temperature. After 180 minutes, the resulting liquor was drained to a liquor tank and using steam the wood was blown to a cyclone to collect the wood (121.6 Lb dry wood) and vent the vapor. The material was analyzed as described above. The analyses of the hemi depleted lignocellulose material show extraction of 83.9% Arabinan, 84.3% Galactan, 50.1% Xylan, 59.8% Manan and no extraction of glucan, indicating effective extraction of hemicellulose. Analyses also show extraction of 21.8% of "others" including lignin, extractives and ash.

Eucalyptus (ref A120702K6-9): Fresh Eucalyptus Globulus chips (79.1 Kg dry wood) were fed into a Rapid Cycle Digester (RDC, Andritz, Springfield, Ohio). An acid aqueous solution was prepared by adding 0.5% H2SO4 and 0.2% SO2 to water in a separate tank. The solution was heated to 145 C and then added to digester to cover the wood. The solution was circulated through the wood for 60 minutes while maintaining the temperature, then heating was stopped while circulation continued for another 60 minute, allowing the solution to cool. After 120 minutes, the resulting liquor was drained to a liquor tank and using steam the wood was blown to a cyclone to collect the wood (58.8 Kg dry wood) and vent the vapor. The material was analyzed as described above. Analyses showed that 20.1% of the carbohydrates were extracted from the wood (dry wood base) xylose containing 70% of these sugars, 91% of the sugars in the liquor present as monomers. Under these conditions acetic acid concentration in the liquor was 3.6% (dry wood base) showing maximal removal of acetate groups from hemicellulose sugars; 4.2% (dry wood base) of acid soluble lignin. These results indicate effective extraction of hemicellulose and in particularly xylose, along with hydrolysis of the acetate groups from substituted xylosans. At the same time a significant amount of acid soluble lignin, extractives and ash are also extracted into the liquor.

TABLE 2

Chemical analysis of lignocellulose matter after hemicellulose sugar extraction

| Ref | Biomass Type | Ash % wt | Ca ppm | Na ppm | Mg ppm | K ppm | % Arabinan | % Galactan | % Glucan | % Xylan | % Mannan | % Total Carbohydrate | DCM Extractives |
|---|---|---|---|---|---|---|---|---|---|---|---|---|---|
| A1202102-5[1] | Pine | 0.59 | 248 | NA | 123 | 92 | 0.25 | 1.33 | 48.13 | 4.75 | 8.48 | 62.94 | NA |
| A1204131-14(K1)[2] | Pine | 0.31 | 113 | 388 | 44 | 23 | 0.21 | 0.38 | 51.68 | 3.14 | 4.89 | 60.30 | 1.07 |
| A120702K6-9[3] | *Eucalyptus* | 0.35 | 95 | 109 | 30 | 72 | <0.01 | 0.03 | 67.48 | 2.13 | 0.20 | 69.54 | 0.26 |

[1]Hemicellulose sugar extraction: 135° C. for 60 minutes, 0.3% $H_2SO_4$, 0.2% $SO_2$.
[2]Hemicellulose sugar extraction: 135° C. for 180 minutes, 0.3% $H_2SO_4$, 0.2% $SO_2$.
[3]Hemicellulose sugar extraction: 145° C. for 60 minutes + cool down 60 minutes, 0.3% $H_2SO_4$, 0.2% $SO_2$.

Example 3

Direct Lignin Extraction

After hemicellulose sugars were extracted from eucalyptus chips, the remainder was mainly cellulose and lignin. The remainder was delignified using an aqueous organic solution containing acetic acid according to the process described below.

Eucalyptus wood chips (20.0 g) were mixed with a solution of 50/50 v/v of methylethylketone (MEK) and water that contains 1.2% acetic acid w/w of solution at a ratio of 1:10 (100 mL water, 100 mL MEK, and 2.2 g acetic acid). The mixture was treated at 175° C. for 4 hours in an agitated reactor. Then the system was allowed to cool to 30° C. before the reactor is opened. The slurry was decanted and the solid is collected for further analysis.

After the reaction, there was 127 g free liquid, of which 47.2 g organic and 79.8 g aqueous. The organic phase contained 1.1 g acetic acid, 10.4 g water, and 5.5 g dissolved solids (0.1 g sugars and 5.4 g others, which is mainly lignin). The aqueous phase contained 1.4 g acetic acid, 2.1 g dissolved solids (1.5 g sugars and 0.6 g other).

After decanting of the liquid, black slurry and white precipitate were at the bottom of the bottle. This material was vacuum-filtered and washed thoroughly with 50/50 v/v MEK/water (119.3 g MEK 148.4 g water) at room temperature until the color of the liquid became very pale yellow. Three phases were collected; organic 19.7 g, aqueous 215 g, and white solid 7 g dry. The organic phase contained 0.08 g acetic acid and 0.37 g dissolved solids. The aqueous phase contained 0.56 g acetic acid and 0.6 g dissolved solids.

All organic phases were consolidated. The pH of the solution is adjusted to pH 3.8. The solution was then allowed to separate into an aqueous phase (containing salts) and an organic phase (containing lignin). The lignin-containing organic phase was recovered and purified using a strong acid cation column. The organic solution was then added dropwise into an 80° C. water bath to precipitate the lignin.

Similarly, lignin from bagasse was extracted by reacting sulfuric acid pretreated bagasse (D.S~60%) in a mixture of acetic acid (0.3% w/w of o.d. bagasse), methyl ethyl ketone, and water at 200° C. for 160 min. Bagasse-to-liquid ratio was 1:10 and the liquid phase was 50% v/v MEK-to-water. The reaction was carried out in a Parr reactor. After reaction time, the mixture was filtered and the liquid organic phase separated using a separatory funnel. The pH of the organic phase was adjusted to ~3.8 with sodium hydroxide. Afterwards, the organic phase was passed through SAC resin and added dropwise to an 80° C. MEK bath. The lignin precipitated and collected by filtration. The lignin was dried in the oven at 105° C.

Example 4

Fractionation of Lignin

Lignin from bagasse and eucalyptus feedstock was prepared according to examples 1 through 3. The dry lignin was mixed with a solvent at a ratio of 1:5 wt/wt and stirred for two hours at room temperature. The mixture was filtered and the solvent phase was evaporated under reduced pressure. The two solids (from filtration and evaporation) were dried in the oven at 105° C. to obtain the solvent soluble (SS) fraction and the solvent insoluble (SI) fraction. Solvents tested include methanol, ethanol, isopropanol, ethyl acetate, ethyl formate and dichloromethane. It is anticipated that other solvents may be useful to achieve similar fractionation.

The solvent soluble (SS) and solvent insoluble (SI) fractions were weighed after fractionation with each of three solvents (methanol, dichloromethane, and ethyl acetate), and the results are depicted in Table 1.

TABLE 1

Weight percentage of bagasse lignin fractionation in several solvents

| | Feedstock | Soluble Fraction (% wt) | Insoluble Fraction (% wt) |
|---|---|---|---|
| Methanol | Bagasse | 35 | 65 |
| DCM | Bagasse | 26 | 74 |
| Ethyl acetate | Bagasse | 44 | 56 |
| Methanol | Eucalyptus | 58 | 42 |
| DCM | Eucalyptus | 55 | 45 |
| Ethyl acetate | Eucalyptus | 50 | 50 |

Example 5

Lignin Characterization Methods

Lignin samples were characterized by elemental analysis (i.e. C, H, O, N, and S).

NMR experiments were performed using Bruker Avance-400 spectrometer. Quantitative $^{13}C$ NMR spectrum was acquired using DMSO-d6 (500 μL) as solvent for lignin (80 mg), with an inverse gated decoupling sequence, 90° pulse angle, 12-s pulse delay, and 12000 scans. Hydroxyl content analyses were determined using a quantitative $^{31}P$ NMR procedure. An accurate weight (about 40 mg) of a dried lignin sample was dissolved in 500 μL of an anhydrous pyridine/$CDCl_3$ mixture (1.6:1, v/v). Then, 200 μL of an endo-N-hydroxy-5-norbornene-2, 3-dicarboximide (e-NHI) solution (50 mmol/L serving as internal standard) and 50 μL of chromium (III) acetylacetonate solution (11.4 mg/mL serving as a relaxation reagent) were added. The solutions of the internal standard and relaxation reagent were both prepared using an anhydrous pyridine/CDCl$_3$ mixture (1.6:1, v/v). Finally, 100 μL of the phosphitylating reagent 2-chloro-4,4,5,5-tetramethyl-1,2,3-dioxaphospholane) was added, and the mixture was vigorously shaken, transferred into an the NMR tube, and subjected to immediate $^{31}$P NMR analysis. The spectrum was acquired using an inverse gated decoupling pulse sequence, 75° pulse angle, 10-s pulse delay, and 200 scans.

Lignin was also thermally characterized by differential scanning calorimetry (DSC) using the DIN standard method number 53765.

Gel-permeation chromatography (GPC) analysis was carried as followed. Approximately 5 mg of lignin was dissolved in 92:8 (v/v) glacial acetic acid and acetyl bromide mixture (2 ml) and stirred for two hours at room temperature. Acetic acid and excess of acetyl bromide were evaporated with a rotary evaporator connected to a high vacuum pump and a cold trap. The acetylated lignin was immediately dissolved in THF (1 mg/ml), filtered and injected to GPC.

Example 6

Lignin Structure Characterization

Three lignin samples: non-fractionated, and fractionated with methanol (SS and SI) were characterized by the methods of example 5. The original lignin sample was prepared from bagasse according to examples 1 through 3, it was used to prepare lignin fractions SS and SI according to example 4. The results are presented in the following section.

Elemental Analysis

TABLE 2

Elemental Analysis and Chemical Composition of non-fractionated and methanol fractionated bagasse lignin including solvent soluble (SS) fraction and solvent insoluble (SI) fraction.

| | % | | |
|---|---|---|---|
| Elements | Non-fractionated | SS fraction | SI fraction |
| C | 66.2 | 67.1 | 66.6 |
| H | 6.71 | 6.71 | 6.48 |
| N | 0.35 | 0.38 | 0.37 |
| O | 23.6 | 25.8 | 26.55 |
| S | N.D. | N.D. | N.D. |
| Chemical Composition | $C_9H_{10.94}O_{2.40}$ | $C_9H_{10.80}O_{2.60}$ | $C_9H_{10.51}O_{2.69}$ |
| O/C | 0.27 | 0.29 | 0.30 |
| H/C | 1.22 | 1.20 | 1.17 |

Further characterization of the fractionated lignin was collected. The results from the elemental analysis of the fractionated lignin of Table 2 showed no significant differences between non-fractionated and fractionated lignin. The O/C is slightly larger in the insoluble and soluble fractions than the non-fractionated one, while the H/C is smaller.

Hydroxyl Content by $^{31}$P NMR

TABLE 3

Hydroxyl Content of non-fractionated and methanol fractionated bagasse lignin as Determined by Quantitative $^{31}$P NMR

| | Total Phenolic OH (mmol/g lignin) | | | |
|---|---|---|---|---|
| Species | Aliphatic OH (mmol/g lignin) | Syringyl and Condensed Phenolic OH (mmol/g lignin) | Guaiacyl and/or p-hydroxyphenyl Phenolic OH (mmol/g lignin) | Carboxylic OH (mmol/g lignin) |
| Non-fractionated | 1.00 | 1.29 | 1.70 | 0.35 |
| Soluble fraction | 1.29 | 2.16 | 3.11 | 0.40 |
| Insoluble fraction | 1.29 | 1.52 | 1.98 | 0.37 |

As seen from the $^{31}$P NMR data (Table 3), after lignin fractionation the two fractions are structurally different than the non-fractionated lignin. Methanol fractionation resulted in lignin fractions with more aliphatic, phenolic, and carboxylic OH groups. The solvent soluble SS fraction contains similar amounts of aliphatic OH to that of the insoluble fraction. However, the soluble fraction has more phenolic OH and carboxylic OH than the insoluble fraction. This is rational given the fact that more phenolic OH would be required for dissolution. The increase in guaiacyl OH in $^{31}$P data is also supported by the decrease in aliphatic linkages as shown in Table 3. The lignin macromolecule opened when mixed with methanol.

Structure Analysis by $^{13}$C NMR

TABLE 4

Quantitative Comparison between non-fractionated and methanol fractionated bagasse lignin based on the $^{13}$C NMR Spectra

| | Non-fractionated | SS fraction | SI fraction |
|---|---|---|---|
| Degree of condensation | 0.36 | 0.33 | 0.27 |
| Methoxyl content (#/aryl group) | 0.9 | 0.8 | 0.8 |
| Carboxylic groups (COOH) | 0.2 | 0.2 | 0.2 |
| Aliphatic linkages (β-O-4') (#/aryl group) | 0.2 | 0.1 | 0.1 |
| Aromatic C—O (#/aryl group) | 1.7 | 1.6 | 1.6 |
| Aromatic C—C (#/aryl group) | 2.2 | 2.3 | 2.2 |
| Aromatic C—H (#/aryl group) | 2.1 | 2.1 | 2.2 |
| S/G | 1 | 0.9 | 0.9 |
| h:g:s | 18:42:41 | 13:47:41 | 11:48:41 |

The $^{13}$C NMR spectra of the fractionated lignin vs. the material before fractionation are consistent with the observation made by $^{31}$P NMR that the methanol treatment opens some internal linkages in the lignin molecule, as seen in the decrease in methoxyl content, β-O-4' content, aromatic C—O content, but not in the aromatic C—C content.

Molecular Weight Determination by GPC

Gel-permeation chromatography (GPC) analysis was carried according to Asikkala et. al., *Journal of agricultural and food chemistry*, 2012, 60(36), 8968-73. Approximately 5 mg of lignin was dissolved in 92:8 (v/v) glacial acetic acid and acetyl bromide mixture (2 ml) and stirred for two hours at room temperature. Acetic acid and excess of acetyl bromide were evaporated with a rotary evaporator connected to a high vacuum pump and a cold trap. The acetylated lignin was immediately dissolved in THF (1 mg/ml), filtered and injected to GPC.

Figure 3:
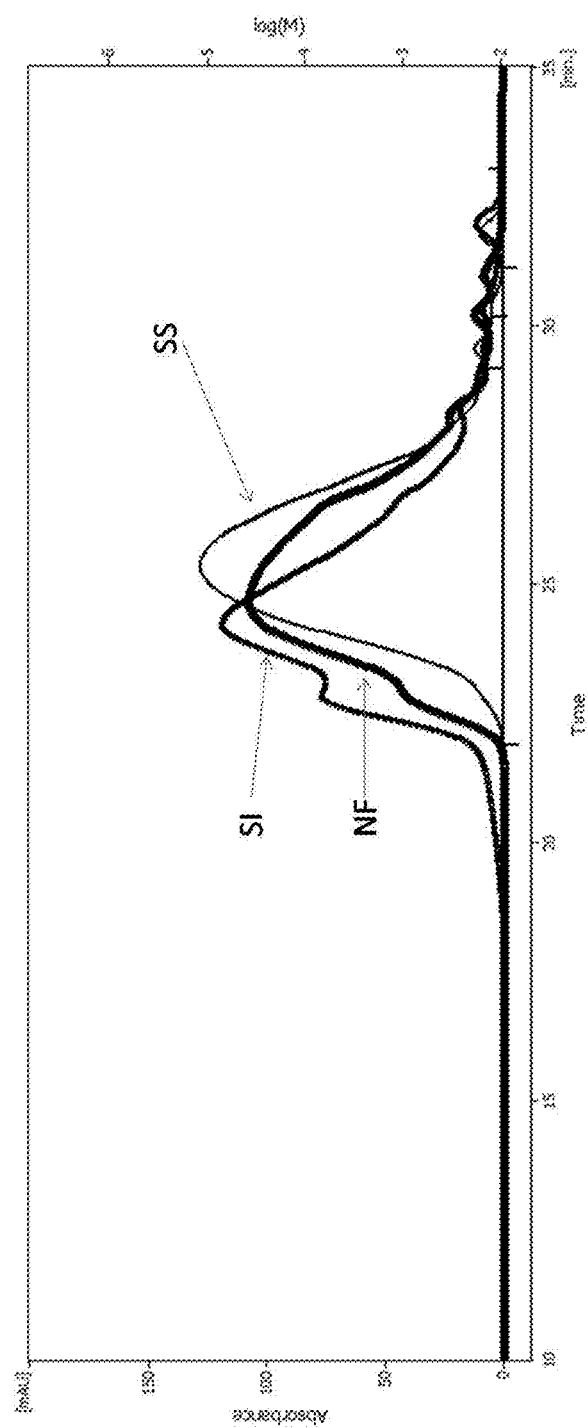
FIG. 3 is an overlay of gel permeation chromatography (GPC) of non-fractionated high purity lignin made from bagasse (NL), and its fractions obtained by methanol fractionation: SS is the methanol soluble fraction, SI is the methanol insoluble fraction.
Figure 4:
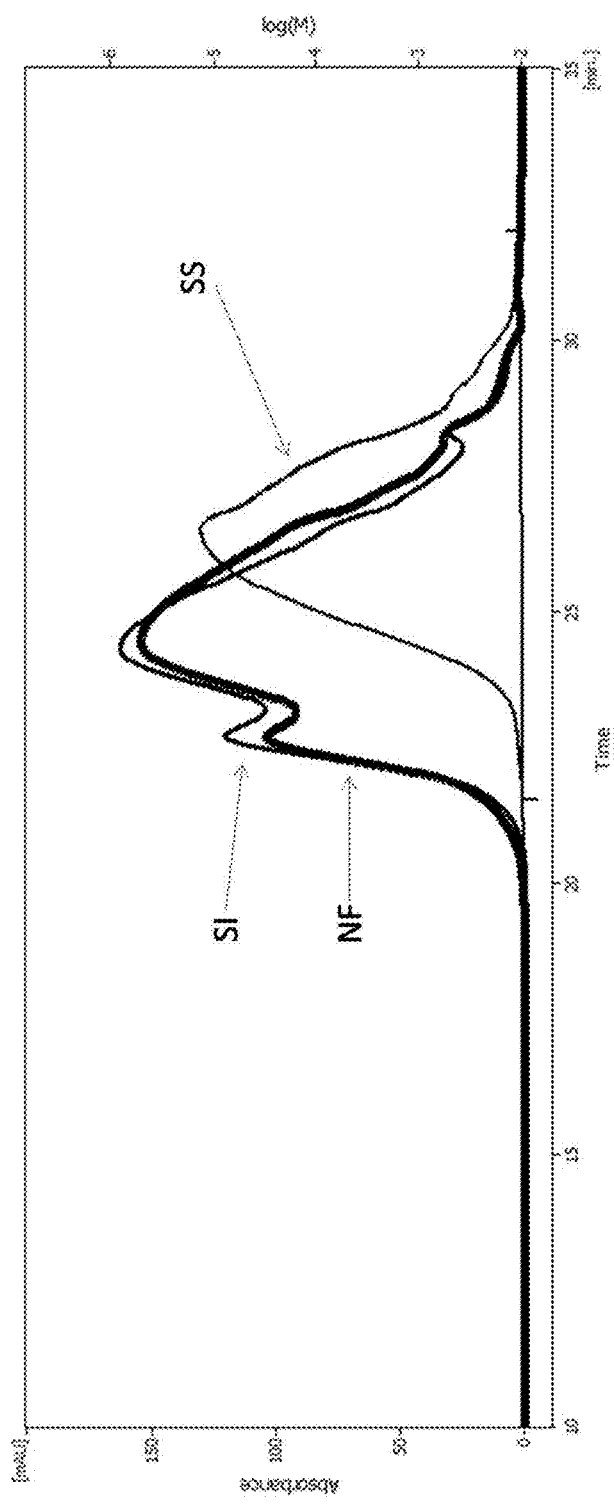
FIG. 4 is an overlay GPC of non-fractionated high purity lignin made from bagasse (NL), and its fractions obtained by dichloromethane fractionation: SS is the dicholormethane soluble fraction, SI is the dichloromethane insoluble fraction.
Figure 5:
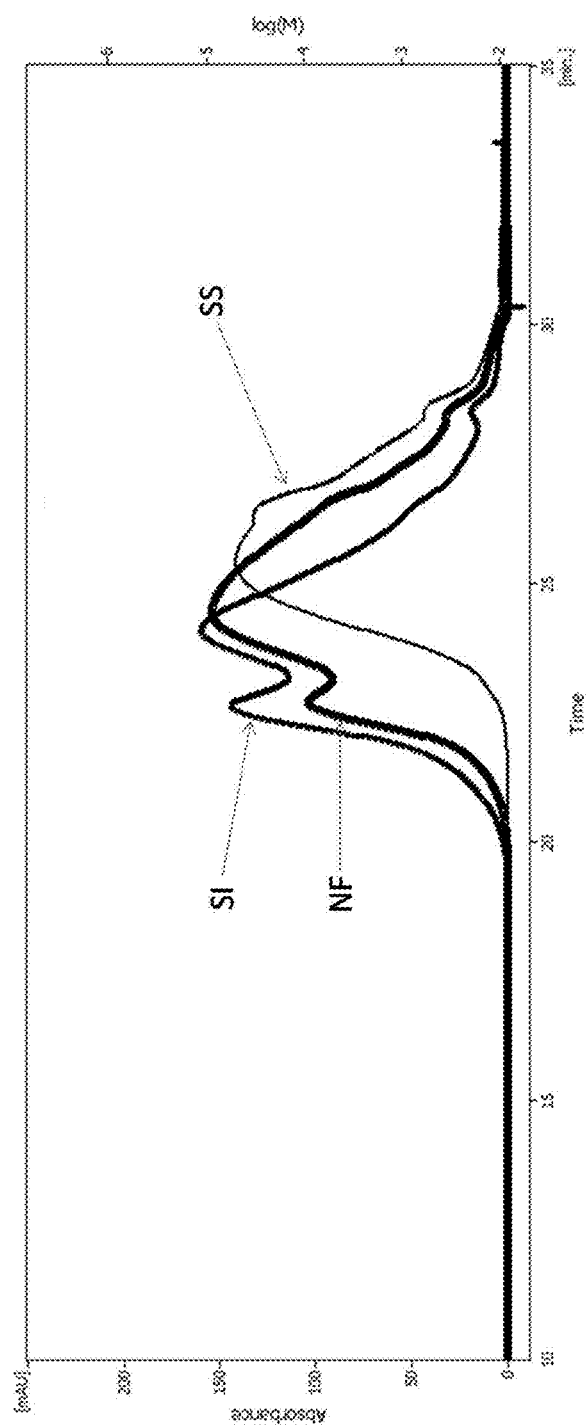
FIG. 5 is an overlay GPC of non-fractionated high purity lignin made from bagasse (NL), and its fractions obtained by ethyl acetate fractionation: SS is the ethyl acetate soluble fraction, SI is the ethyl acetate insoluble fraction.

The molecular weight of lignin fractions as well as the non-fractionated sample was analyzed by GPC. FIG. 3 presents fractionation by methanol. NF denotes the non-fractioned lignin, SS the solvent soluble fraction and SI the solvent insoluble fraction; FIG. 4 presents fractionation by dichloromethane; FIG. 5 presents fractionation by ethyl acetate. It is observed that in all cases the solvent soluble fraction has lower MW compared to the insoluble fraction. The results are summarized in Table 5.

TABLE 5

GPC analysis of non-fractionated and fractionated bagasse lignin

|  | Mn | Mw | PD |
|---|---|---|---|
| Non-Fractionated Lignin | 3558 | 6130 | 1.72 |
| DCM SS | 160 | 960 | 5.80 |
| DCM SI | 3905 | 6090 | 1.56 |
| Ethyl acetate SS | 240 | 1600 | 6.53 |
| Ethyl acetate SI | 6660 | 11178 | 1.68 |
| Methanol SS | 380 | 2000 | 5.3 |
| Methanol SI | 9282 | 18304 | 1.97 |

Thermal Analysis by DSC

DSC was performed according to DIN 53765: the sample is first dried by a pre-heat cycle. Then, two consecutive heat cycles were measured, typically in the first cycle annealing processes took place that affected the polymer structure, while in the second cycle the major transition Tg is ascribed to the glass transition of the polymer. The thermograms of the non-fractionated lignin, the SS fraction and the SI fractions are presented in FIG. 6-8 and the results are summarized in Table 6.

TABLE 6

Thermal characterization non-fractionated and methanol fractionated bagasse lignin using DSC

|  | Non-fractionated | Methanol soluble fraction | Methanol insoluble fraction | DCM soluble fraction* | DCM insoluble fraction | Ethyl acetate soluble fraction | Ethyl acetate insoluble fraction |
|---|---|---|---|---|---|---|---|
| Tg (° C.) - Din $1^{st}$ cycle | 107 | 91 | 160 | — | 167 | 80 | 196 |
| Tg (° C.) - Din $2^{nd}$ cycle | 130 | 94 | 158 | — | 166 | 87 | 192 |

*No Tg point was observed. This could mean that the DCM soluble fraction is not a polymer.

Figure 6A:
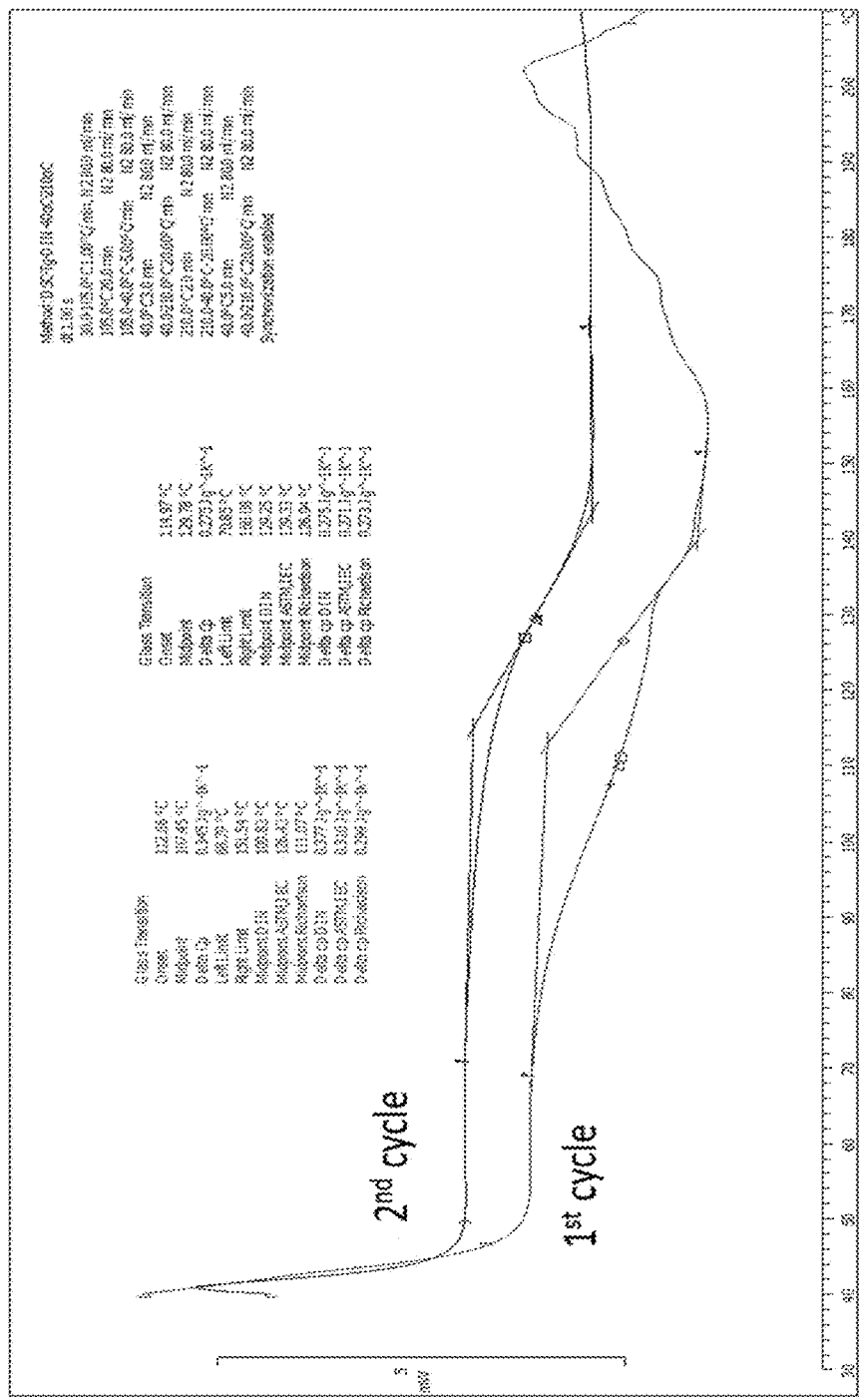
FIG. 6A is a differential scanning calorimeter (DSC) thermogram of non-fractionated (NF) lignin.
Figure 6B:
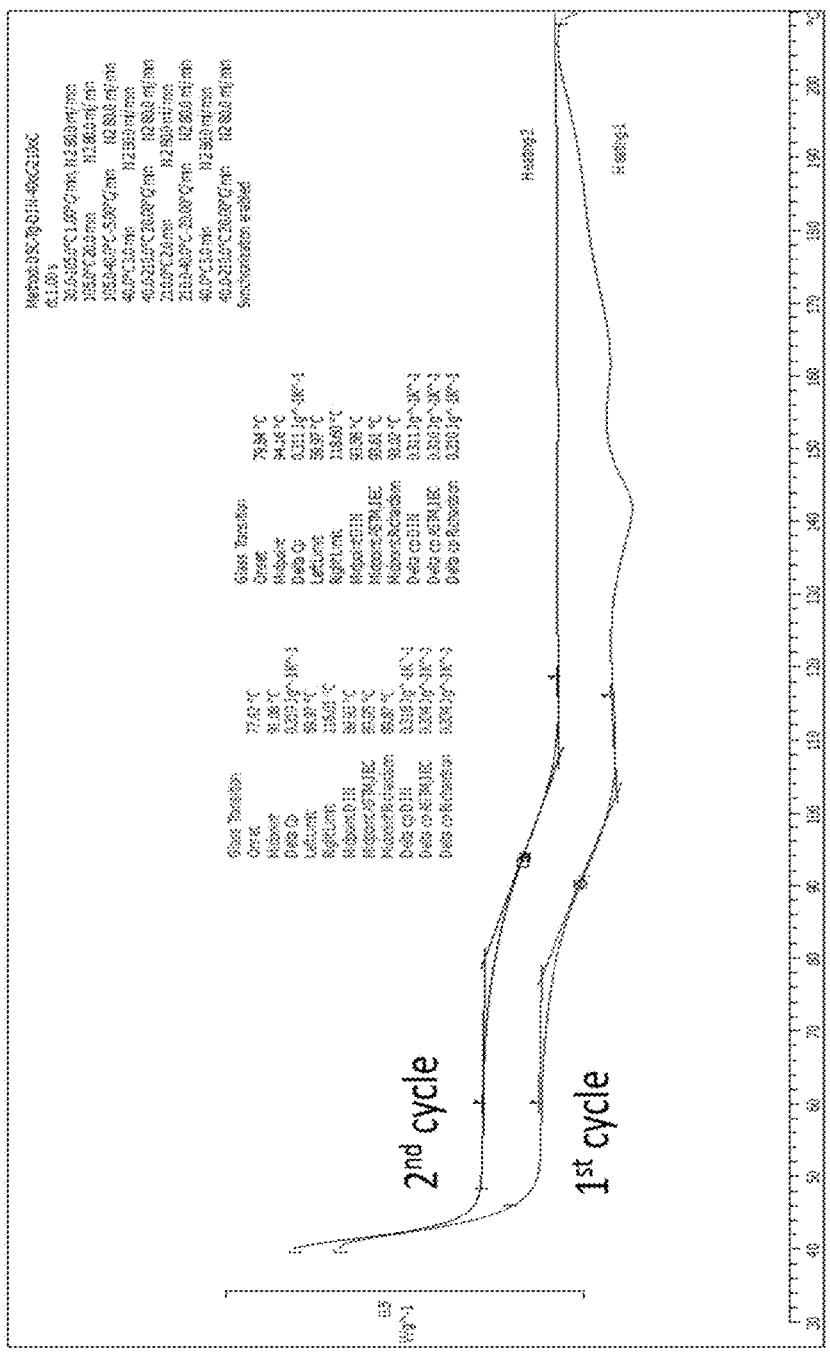
FIG. 6B is a DSC thermogram of methanol solvent soluble (SS) lignin fraction.
Figure 6C:
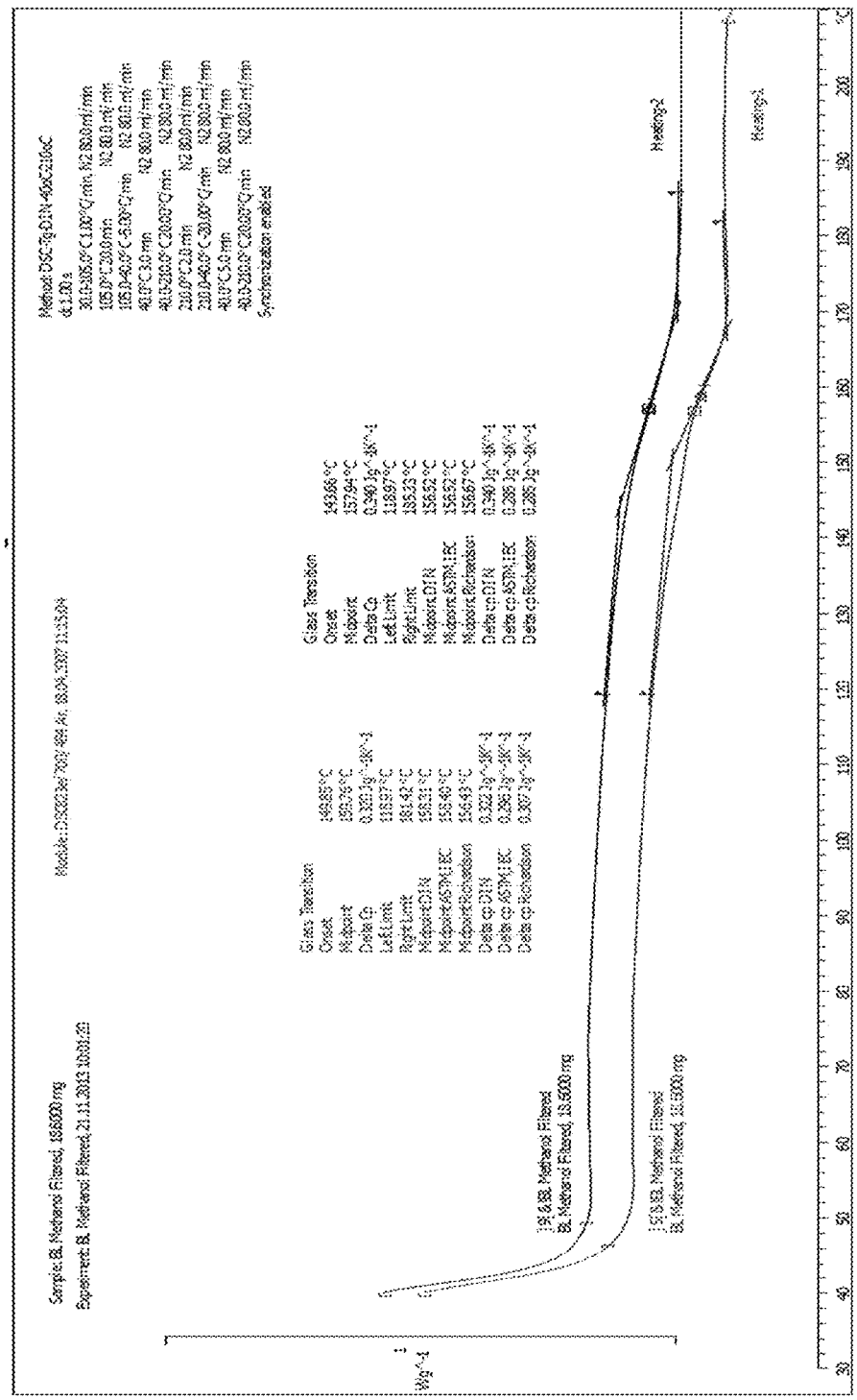
FIG. 6C is a DSC thermogram of methanol solvent insoluble (SI) lignin fraction.

The thermogram of the non-fractionated lignin, FIG. 6A, indicated multiple changes in the lignin polymer at temperatures above 150° C. and a large change of 23° C. in the glass transition between the first and the second cycle. In marked contrast to this, the thermogram of the methanol soluble fraction (FIG. 6B) showed a glass transition at lower temperatures, ca. 117° C., consistent with it being the lower molecular weight fraction. The change from cycle 1 to cycle 2 was only 3° C. and while the thermogram still showed some annealing processes occurring above the glass transition, the extent of these changes is lower than in the non-fractionated lignin. The methanol insoluble fraction showed a glass transition at higher temperature, ca. 157° C., consistent with this fraction having larger molecular weight. The thermograms are essentially the same for $1^{st}$ and $2^{nd}$ cycle (decrease of 2° C. between the cycles), and no endotherms or exotherms observed at temperatures above the glass transition. These thermograms indicate that distinctively two different lignin fractions were prepared by methanol fractionation treatment. The thermograms also indicate that each fraction is stable under heating, and does not manifest thermal annealing processes that were observed in the untreated sample as is commonly found in the literature.

Figure 7A:
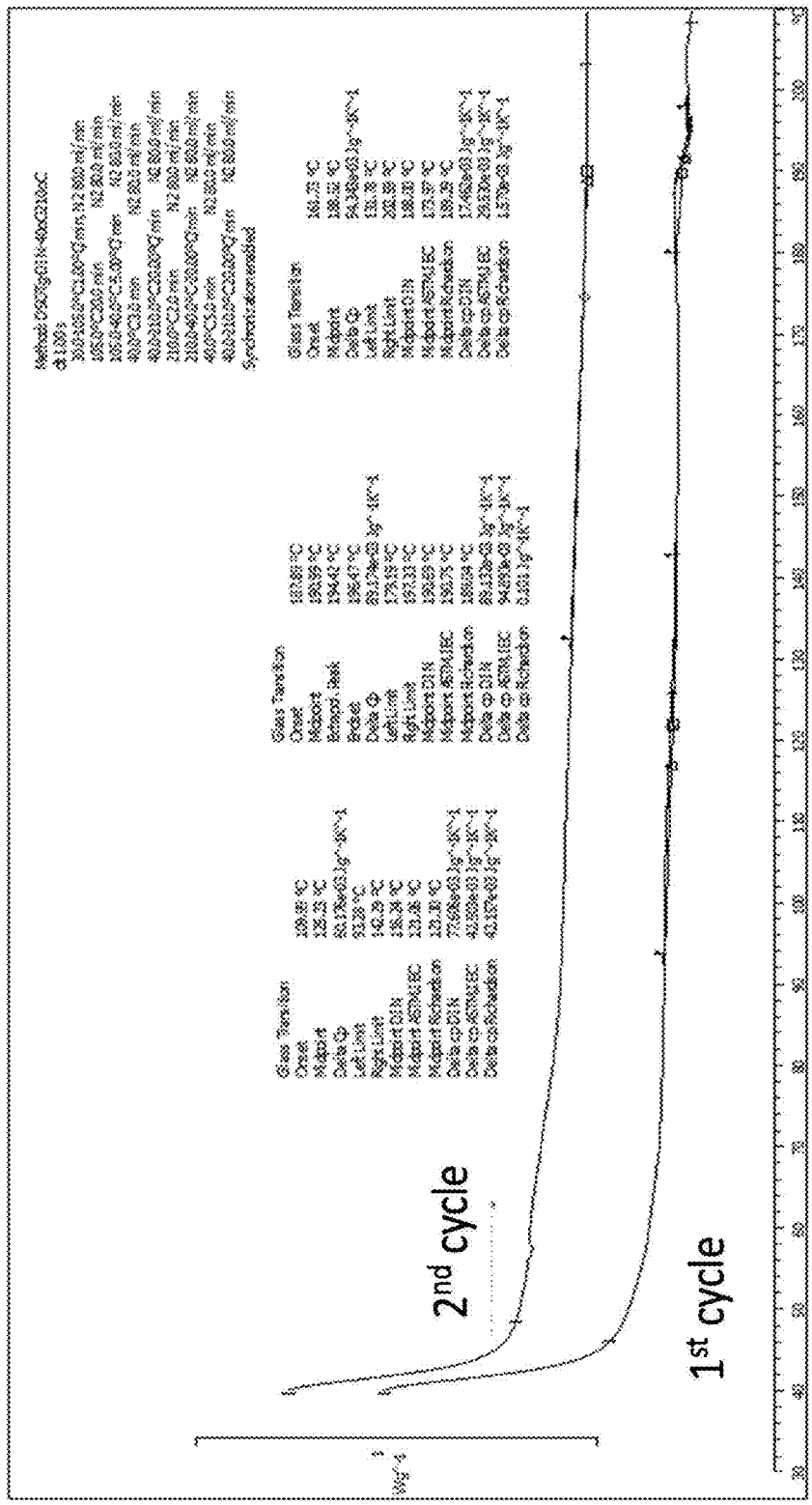
FIG. 7A is a differential scanning calorimeter (DSC) thermogram of dichloromethane solvent soluble (SS) bagasse lignin fraction.
Figure 7B:
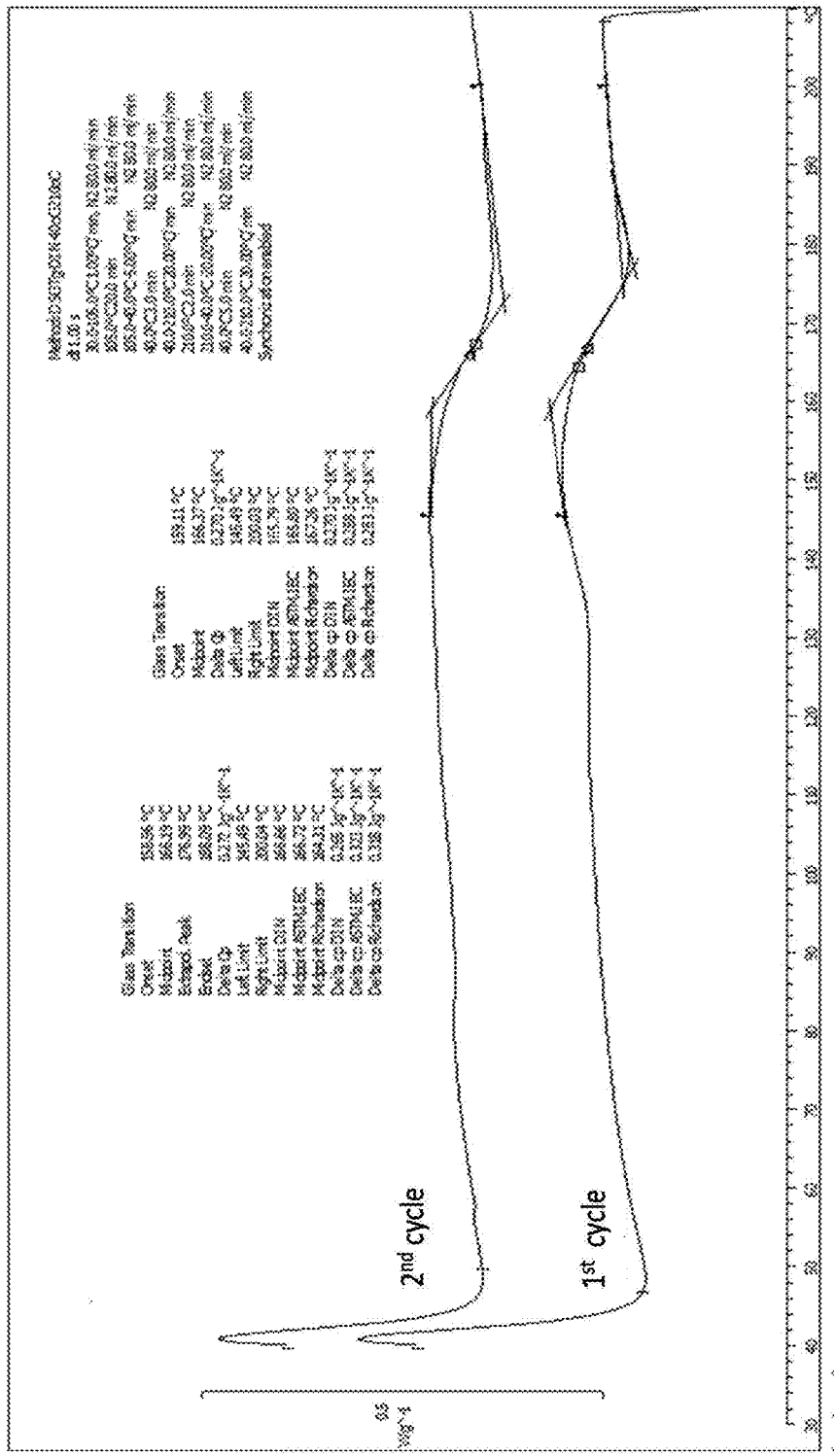
FIG. 7B is a DSC thermogram of dichloromethane solvent insoluble (SI) bagasse lignin fraction.

The differential scanning calorimeter (DSC) thermograms of dichloromethane solvent soluble (SS) bagasse lignin fraction and DSC thermogram of dichloromethane solvent insoluble (SI) bagasse lignin fraction are shown in FIG. 7A and FIG. 7B respectively. Lignin fractionated by dichloromethane (DCM) furnished a dichloromethane soluble fraction that did not have a Tg point. Without being bound by a particular theory, this could support the assertion that the DCM soluble lignin fraction is not a polymer. However, the DCM insoluble fraction had a Tg 167° C. in the $1^{st}$ cycle and 166° C. in the second cycle. This lignin has a Tg higher temperature than that of non-fractionated lignin, and a change in temperature between cycles of only 1° C.

Figure 8A:
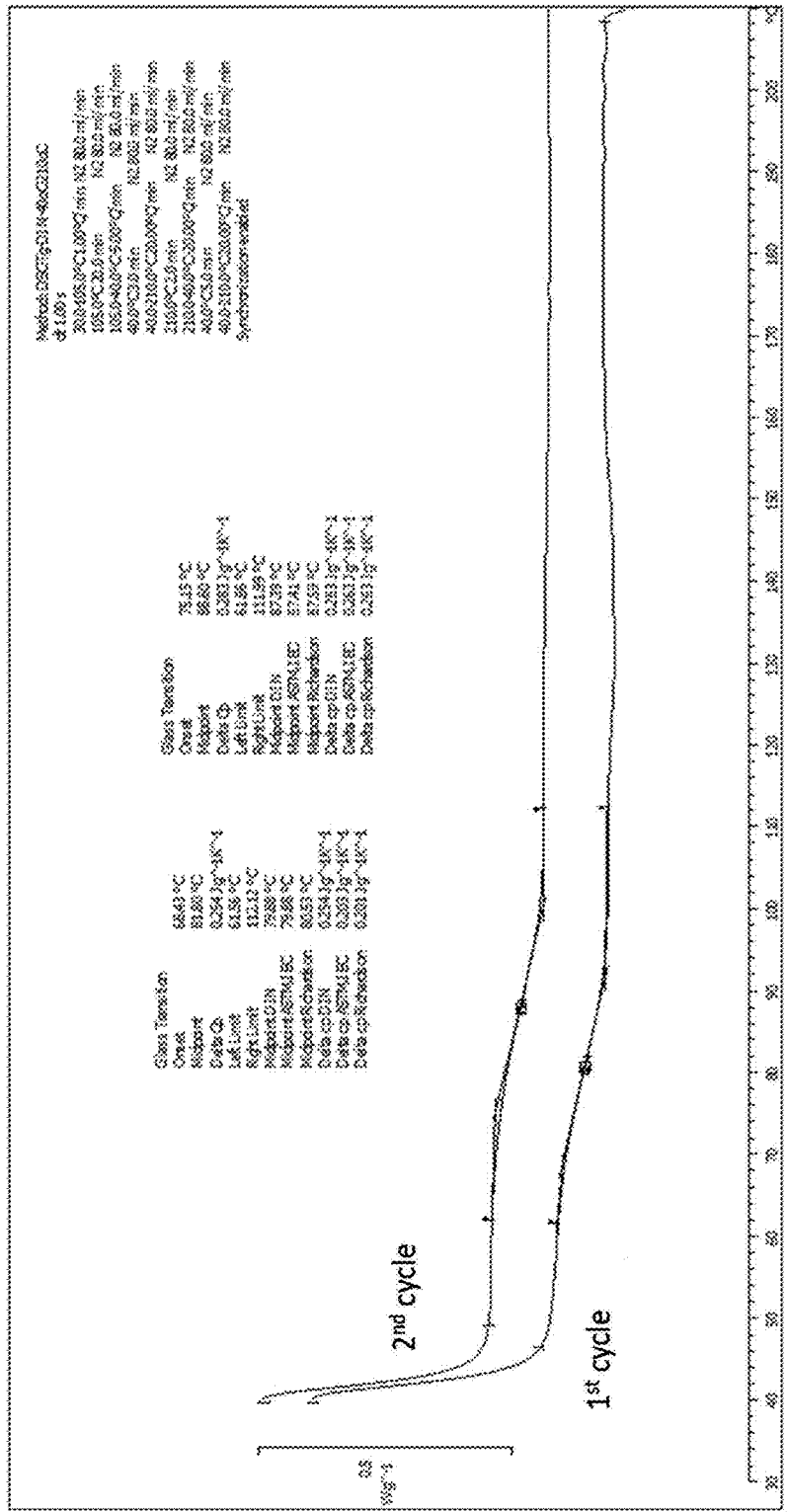
FIG. 8A is a differential scanning calorimeter (DSC) thermogram of ethyl acetate solvent soluble (SS) bagasse lignin fraction.
Figure 8B:
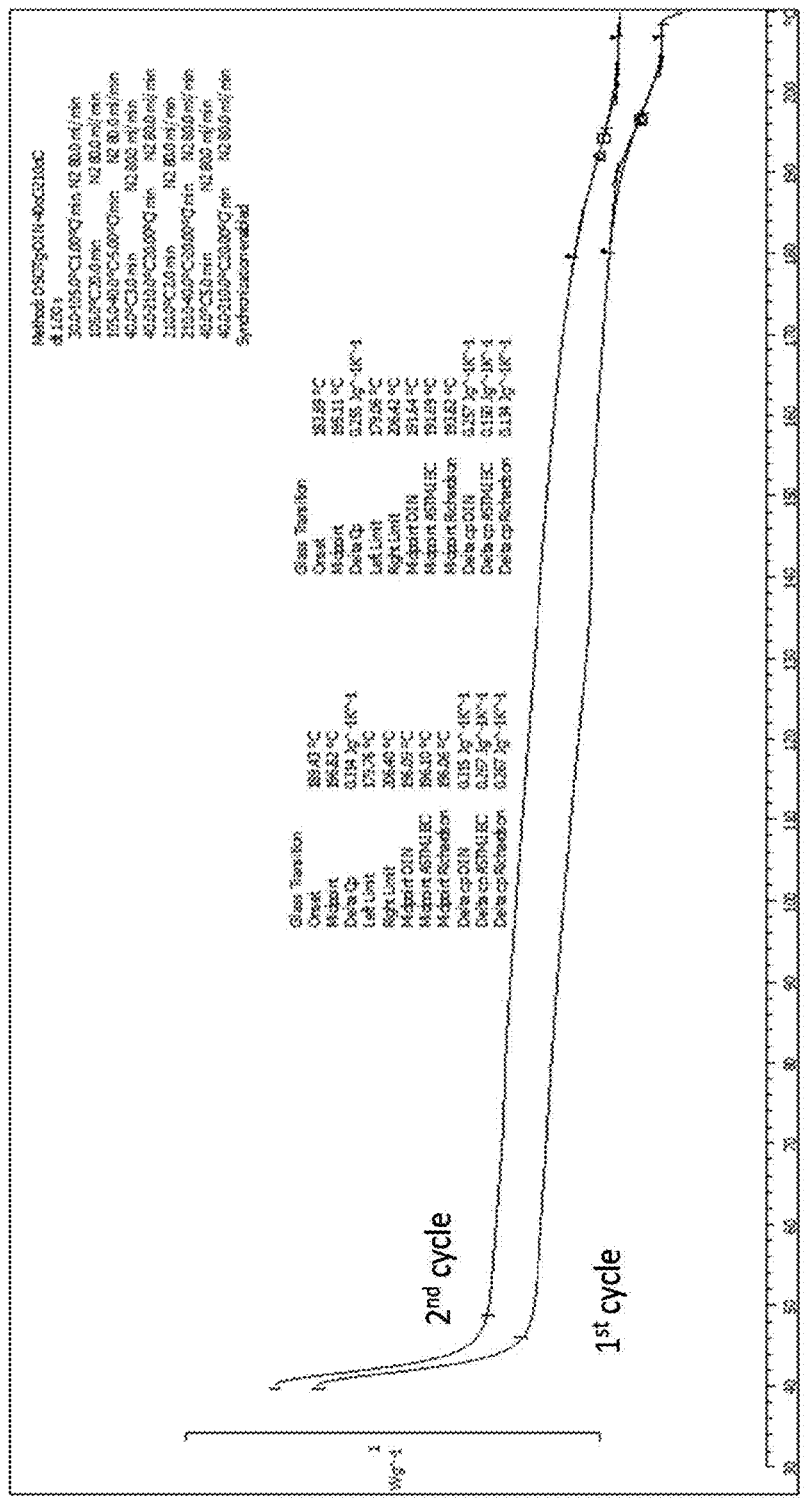
FIG. 8B is a DSC thermogram of ethyl acetate solvent insoluble (SI) bagasse lignin fraction.

The differential scanning calorimeter (DSC) thermograms of ethyl acetate solvent soluble (SS) bagasse lignin fraction and DSC thermogram of ethyl acetate solvent insoluble (SI) bagasse lignin fraction are shown in FIG. 8A and FIG. 8B respectively. Lignin fractionated by ethyl acetate furnished a soluble fraction with low Tg points (80 and 87° C.). The ethyl acetate insoluble fraction had high and stable Tg points of 196° C. in the $1^{st}$ cycle and 192° C. in the second cycle. This lignin has a Tg higher temperature than that of non-fractionated lignin, and a change in temperature between cycles of only 4° C.

What is claimed is:

1. A method comprising:
   (i) providing a lignin composition characterized by a consistent glass transition temperature (Tg) as determined by two consecutive differential scanning calorimetry (DSC) runs of the same lignin portion according to DIN 53765-1994, wherein a first Tg is measured during a first DSC run, a second Tg is measured during a second DSC run, and the difference between the first Tg and the second Tg is less than 10° C., and
   (ii) converting at least a portion of lignin in the composition to a conversion product.

2. The method of claim 1, wherein the converting comprises treating the lignin composition with hydrogen or a hydrogen donor.

3. The method of claim 1, wherein the conversion product is selected from the group consisting of bio-oil, carboxylic and fatty acids, dicarboxylic acids, hydroxyl-carboxylic, hydroxyl di-carboxylic acids and hydroxyl-fatty acids, methylglyoxal, mono-, di- or poly-alcohols, alkanes, alkenes, aromatics, aldehydes, ketones, esters, phenols, benzene, toluenes, and xylenes.

4. The method of claim 1, wherein the conversion product is selected from the group consisting of dispersants, emulsifiers, complexants, flocculants, agglomerants, pelletizing additives, resins, carbon fibers, active carbon, antioxidants, liquid fuel, aromatic chemicals, vanillin, adhesives, binders, absorbents, toxin binders, foams, coatings, films, rubbers and elastomers, sequestrants, fuels, and expanders.

5. The method of claim 1, wherein the conversion product comprises a fuel or a fuel ingredient.

6. The method of claim 1, wherein the second Tg is above 160° C.

7. The method of claim 6, wherein the conversion product is a carbon fiber.

8. The method of claim 6, wherein the converting comprises carbon fiber production.

9. The method of claim 1, wherein the second Tg is below 100° C.

10. The method of claim 9, wherein the conversion product is selected from the group consisting of bio-oil, carboxylic and fatty acids, dicarboxylic acids, hydroxyl-carboxylic, hydroxyl di-carboxylic acids and hydroxyl-fatty acids, methylglyoxal, mono-, di- or poly-alcohols, alkanes, alkenes, aromatics, aldehydes, ketones, esters, phenols, benzene, toluenes, and xylenes.

11. The method of claim 9, wherein the converting comprises cracking lignin to small aromatic molecules.

12. The method of claim 1, wherein the lignin composition comprises:
    ash in an amount less than 0.5%;
    sulfur in an amount less than 700 ppm; and
    soluble carbohydrates in an amount less than 0.5%.

13. A composition comprising:
    lignin, wherein the lignin is characterized by a consistent glass transition temperature (Tg) as determined by two consecutive differential scanning calorimetry (DSC) runs of the same lignin portion according to DIN 53765-1994, wherein a first Tg is measured during a first DSC run, a second Tg is measured during a second DSC run, and the difference between the first Tg and the second Tg is less than 10° C.; and
    a second ingredient.

14. The composition of claim 13, comprising up to 98% wt/wt of the lignin.

15. The composition of claim 14, comprising between 5% and 75% wt/wt of the lignin.

16. The composition of claim 13, wherein the composition is a polymer, a precursor to a commodity chemical, a commodity chemical, or a consumer good.

17. The composition of claim 13, wherein the composition is selected from the group consisting of a fuel additive, a carbon fiber, a material for carbon fiber production, asphalt, a component of a biopolymer, an oil well drilling additive, a concrete additive, a dyestuff dispersant, an agricultural chemical, animal feed, an industrial binder, a specialty polymer for paper industry, a precious metal recovery aid, a material for wood preservation, a sulfur-free lignin product, an automotive brake, a wood panel product, a bio-dispersant, a polyurethane foam, an epoxy resin, a printed circuit board, an emulsifier, a sequestrant, a water treatment formulation, a strength additive for wallboard, an adhesive, and a material for the production of vanillin, xylitol, paracoumaryl alcohol, coniferyl alcohol, sinapyl alcohol, benzene, xylenes, or toluene.

18. The composition of claim 13, wherein the second Tg is above 160° C.

19. The composition of claim 18, wherein the composition is a carbon fiber.

20. The composition of claim 13, wherein the second Tg is below 100° C.

* * * * *